US008528505B2

(12) United States Patent
Murata

(10) Patent No.: US 8,528,505 B2
(45) Date of Patent: Sep. 10, 2013

(54) ROTARY INTERNAL COMBUSTION ENGINE

(76) Inventor: Makoto Murata, Tokyo (JP)

(*) Notice: Subject to any disclaimer, the term of this patent is extended or adjusted under 35 U.S.C. 154(b) by 815 days.

(21) Appl. No.: 12/675,061

(22) PCT Filed: Feb. 19, 2009

(86) PCT No.: PCT/JP2009/052833
§ 371 (c)(1),
(2), (4) Date: Feb. 24, 2010

(87) PCT Pub. No.: WO2010/095225
PCT Pub. Date: Aug. 26, 2010

(65) Prior Publication Data
US 2011/0107999 A1  May 12, 2011

(51) Int. Cl.
*F01C 9/00* (2006.01)
(52) U.S. Cl.
USPC ...... 123/18 A; 123/18 R; 123/241; 123/43 R; 418/35; 418/36; 418/37; 418/38
(58) Field of Classification Search
USPC ............ 123/18 A, 18 R, 35, 36, 37, 38, 43 R, 123/241; 418/35, 36, 37, 38
See application file for complete search history.

(56) References Cited

U.S. PATENT DOCUMENTS 1,145,627 A * 7/1915 Stradovsky ................... 123/248

FOREIGN PATENT DOCUMENTS

| JP | 46-13881 | B1 |   | 4/1971 |
| JP | 48-28811 | A |   | 4/1973 |
| JP | 55-114803 | A |   | 9/1980 |
| JP | 55114803 | A | * | 9/1980 |
| JP | 58-131320 | A |   | 8/1983 |
| JP | 58131320 | A | * | 8/1983 |
| JP | 60-5775 | B2 |   | 2/1985 |
| JP | 64-041601 | A |   | 2/1989 |
| JP | 64-041602 | A |   | 2/1989 |
| JP | 04101021 | A | * | 4/1992 |
| JP | 05-052119 | A |   | 3/1993 |
| JP | 10-231732 | A |   | 9/1998 |

OTHER PUBLICATIONS

JP-55-114803 Machine Translated on Jan. 19, 2013.*
JP-58-131320 Machine Translated on Jan. 19, 2013.*
JP-04-101021 Machine Translated on Jan. 19, 2013.*
Office Action mailed Dec. 19, 2012 for Russian Patent Application No. 2011138258 (with translation).
International Search Report mailed May 19, 2009 for International Patent Application No. PCT/JP2009/052833 (with translation).
Written Opinion of the International Searching Authority mailed May 19, 2009 for International Patent Application No. PCT/JP2009/052833 (with translation).

(Continued)

*Primary Examiner* — Thomas Denion
*Assistant Examiner* — Patrick Maines
(74) *Attorney, Agent, or Firm* — Oliff & Berridge, PLC

(57) ABSTRACT

A rotary internal combustion engine including: a cylinder having a cylinder circumferential wall provided with a horizontal valve groove on its inner circumferential surface; a working shaft concentrically run through said cylinder and held so as to freely rotate; a rotor comprising a rotor base made up of a circular shell and a rotor blade standing in a radial direction of a rotor base surrounding wall; a shutoff valve to perform intermittent movements of insertion and returning between an outside of said cylinder and a cylinder space; and side ribs each having a longitudinal valve groove.

9 Claims, 16 Drawing Sheets

(56) References Cited

OTHER PUBLICATIONS

Sep. 6, 2011 Office Action issued in Japanese Patent Application No. 2011-500390 (with English translation).

Nov. 19, 2012 Office Action issued in Korean Patent Application No. 10-2011-7019773 (with translation).

Nov. 20, 2012 Office Action issued in Canadian Patent Application No. 2, 752, 459.

* cited by examiner (a)   (b)   (c)

ROTARY INTERNAL COMBUSTION ENGINE

TECHNICAL FIELD

The present invention relates to a rotary internal combustion engine.

BACKGROUND TECHNOLOGY

Conventionally, various researches and studies have been made on a rotary internal combustion engine of a type in which combustion pressure directly provides rotation to a piston head. One example is a so-called Wankel cycle engine.

The Wankel cycle engine has conventional problems in that a rotor performs complicated movements that an approximately triangular rotor rotates while revolving, with an eccentric shaft being interposed, in a housing in a shape of an epitrochoid curve and in that leakage of fuel occurs. In the Wankel cycle engine, the rotor having received combustion pressure does not rotate directly and, when the rotor rotates while revolving in the housing, the interposing of the eccentric shaft is required. The eccentric shaft is equivalent to a crank shaft of a reciprocating mechanism. Therefore, the rotor of the Wankel cycle engine does not carry out purely circular movements. In an originally targeted rotary internal combustion engine, a face of a rotor secured to a working shaft in a cylinder is adapted to receive combustion expansion pressure and the rotor performs a circular movement and the combustion expansion pressure directly provides rotation to the working shaft. However, such a rotary internal combustion engine has not been realized yet.

In Patent Reference 1, for example, a rotary engine is disclosed which houses an approximately triangular rotor in cocoon-like housing having an inner circumferential surface in a shape of a trochoid curve.

Patent Reference 1: Japanese Patent Application Laid-open No. 2007-298013.

DISCLOSURE OF THE INVENTION

Problems to be Solved by the Invention

There are three conventional obstacles to achievement of a rotary internal combustion engine. That is, since the space surrounding a rotor of the conventional rotary internal combustion engine has a well hole structure, the following problems arise:
a. It is difficult to construct a combustion chamber in a cylinder or in a manner to face cylinder space.
b. It is impossible to construct a starting point for a mechanical action which can provide combustion expansion pressure to a face of a rotor in a working stroke.
c. A malfunction occurs caused by seizure on a sliding face between a cylinder circumferential wall and rotor outer edge.

The present invention has been made in light of the problems described above and has an object to provide a rotary internal combustion engine as follow:

In a cylinder, being timed to the rotation of a rotor, cylinder space in a radial direction is shut off by a shutoff valve. Then, mixed air or high-pressure air and fuel are injected into a combustion chamber being a sealed layer formed between a rotor blade and the shutoff valve and, at the same time with the injection, the air and fuel are ignited or fired. Rotation is directly provided by combustion expansion pressure generated by the combustion to the rotor and to a working shaft secured to the rotor. It is another object of the present invention to provide the rotary internal combustion engine capable of preventing seizure occurring between the rotor outer edge and contact wall by interposing an elastic body such as a coil spring or a spring between a plurality of components in a rotor base and a rotor blade making up the rotor and by enabling the adjustment of a distance in left and right and upper and lower portions of the rotor.

Means for Solving Problems

To achieve above objects, according to an aspect of the present invention, there is provided a rotary internal combustion engine including a cylinder having a cylinder circumferential wall provided with a horizontal valve groove on its inner circumferential surface, a working shaft concentrically run through the cylinder and held so as to freely rotate, a rotor made up of a rotor base having a circular shell and a rotor blade standing in a radial direction of a rotor base surrounding wall, a shutoff valve to perform intermittent movements of insertion and returning between an outside of the cylinder and a cylinder space, and side ribs each having a longitudinal vale groove, wherein, in cylinder space, both side faces of the rotor base and all outer edge portions of the rotor blade are hermetically in contact with left and right walls and wherein, when the insertion of the shutoff valve into cylinder space is completed, both ends of the shutoff valve are hermetically in contact with two longitudinal valve grooves formed in left and right side ribs, wherein an upper portion of the shutoff valve is hermetically in contact with horizontal valve grooves formed in the cylinder circumferential wall and a lower end surface of the shutoff valve is hermetically in contact with the rotor base circumferential wall to form a sliding face of the rotor base, wherein, immediately after the rotor blade passes through a position of the shutoff valve, the shutoff valve is inserted into the cylinder space to shut off the cylinder space in a radial direction and compressed mixed air or compressed air and fuel are injected into a sealed layer, serving as a combustion chamber, formed between the shutoff valve and the rotor blade to be ignited or fired and the rotor blade is pressed with combustion expansion pressure, with the shutoff valve as a starting point for a mechanical action, to directly provide rotation to the working shaft and combustion gas is released into an exhaust hole and the shutoff valve is returned back to an outside of the cylinder for preparation of a next stroke to terminate one working stroke.

Effects of the Invention

With the above configuration, in the cylinder, being timed to the rotation of the rotor, cylinder space in a radial direction can be shut off by the shutoff valve. Then, mixed air or high-pressure air and fuel are injected into the combustion chamber being the sealed layer formed between the rotor blade and the shutoff valve and, at the same time with the injection, the air and fuel are ignited or fired and, therefore, rotation can be directly provided by combustion expansion pressure generated by the combustion to the rotor and the working shaft secured to the rotor. Seizure occurring between a rotor outer edge and contact wall can be prevented by interposing the elastic body such as a coil spring or a spring between a plurality of components in the rotor base and the rotor blade making up the rotor and by enabling the adjustment of a distance in left and right and upper and lower portions of the rotor.

EXPLANATION OF NUMERALS AND CHARACTERS

Figure 1:
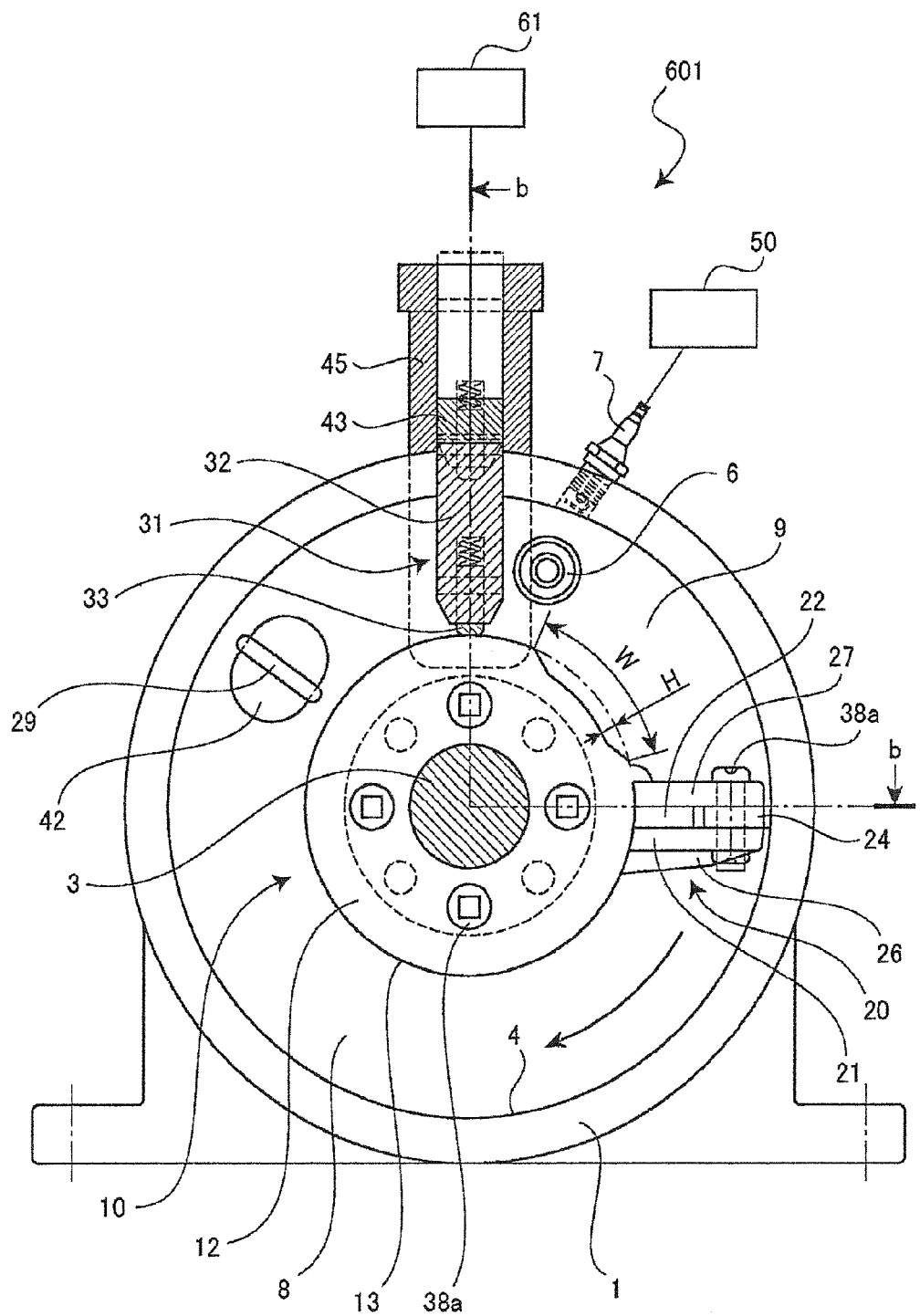
FIG. 1 is a partial cross-sectional view of a rotary internal combustion engine according to the first embodiment of the present invention.

1: Cylinder, 2: Side rid, 3: Working shaft, 4: Cylinder circumferential wall, 5: Side internal wall, 6: Jetting nozzle, 7: Ignition plug, 8: Cylinder space, 9: Combustion chamber, 10: Rotor, 11: Rotor base, 12: Side rotor base, 13: Rotor base surrounding wall, 15: Shaft bush, 17: Bearing, 20: Rotor blade, 21: Blade base plate, 22: Side seal plate, 23: Top seal plate, 24: Corner seal plate, 25: Base plate, 26: Rib, 27: Pressing plate, 28: Ski, 31: Shutoff valve, 32: Valve body, 33: Adjusting valve, 34, 35a to 35d: Coil spring, 37: Bolt, 38a and 38b: Pin, 39a and 39b: Floating hole, 40: Longitudinal valve groove, 41: Horizontal valve groove, 42: Exhaust hole, 50: Switching pointer, 61: Valve reciprocating mechanism, 151: Lifting electromagnet, 156: Suction electromagnet.

BEST MODE CARRYING OUT THE INVENTION

Hereinafter, suitable embodiments of a rotary internal combustion engine of the present invention are described by referring to drawings. The present invention is not limited to the embodiments described above but may be changed and modified, if necessary, without departing from the scope and spirit of the invention.

First, positional relation and terminology of parts or components of the rotary internal combustion engine of the present invention are explained and defined as follow.

(a) In each of drawings, as a general rule, it is supposed that a working shaft of the rotary internal combustion engine is set up in a horizontal position. Hereinafter, its parts or components are described by referring to each of the drawings.

(b) In a cylinder, in order to specify the positional relation of a rotor, its shaft center direction is treated as a lower position and its circumferential inner wall direction is treated as an upper position. This is applied to any rotation angle.

(c) In a back-and-forth relation of a rotary internal combustion engine, while a rotor is rotating, a direction in which a certain portion passes under a horizontal valve groove of the shutoff valve and moves forward is defined as a forth direction.

(d) A "sealed layer" is space which is formed between a rotating rotor and the shutoff valve while the shutoff valve cuts off a cylinder circumferential space. The sealed layer and a combustion chamber is the same and the combustion chamber is called a sealed layer before air and fuel are injected therein.

(e) A "seizure prevention distance" refers to a distance that can prevent seizure owing to expansion distance occurring by combustion heat and sliding.

(f) A "one working stroke" refers to a series of work including the formation of the sealed layer between the shutoff valve and rotating rotor in a cylinder, injection of fuel or air into the sealed layer, rotation of the rotor and working shaft by combustion expansion pressure generated by ignition or firing, exhausting of combustion gas, and returning of the shutoff valve to an outside of the cylinder for movement to a next stroke.

(g) A "working angle" is an angle formed between the shutoff valve and rotor, with a shaft center as a starting point for a mechanical action, when the rotary internal combustion engine is driven.

(h) A "working distance" refers to a distance between a rotor blade and shutoff valve occurring at the time of ending of one working stroke and to a distance of a circular arc to be measured using an average position of height of the rotor blade.

(i) A "tangential angle" is an angle formed between the circumferential wall and left/right side walls.

Hereinafter, each embodiment is described grounded on the above definition.

First Embodiment

Figure 2:
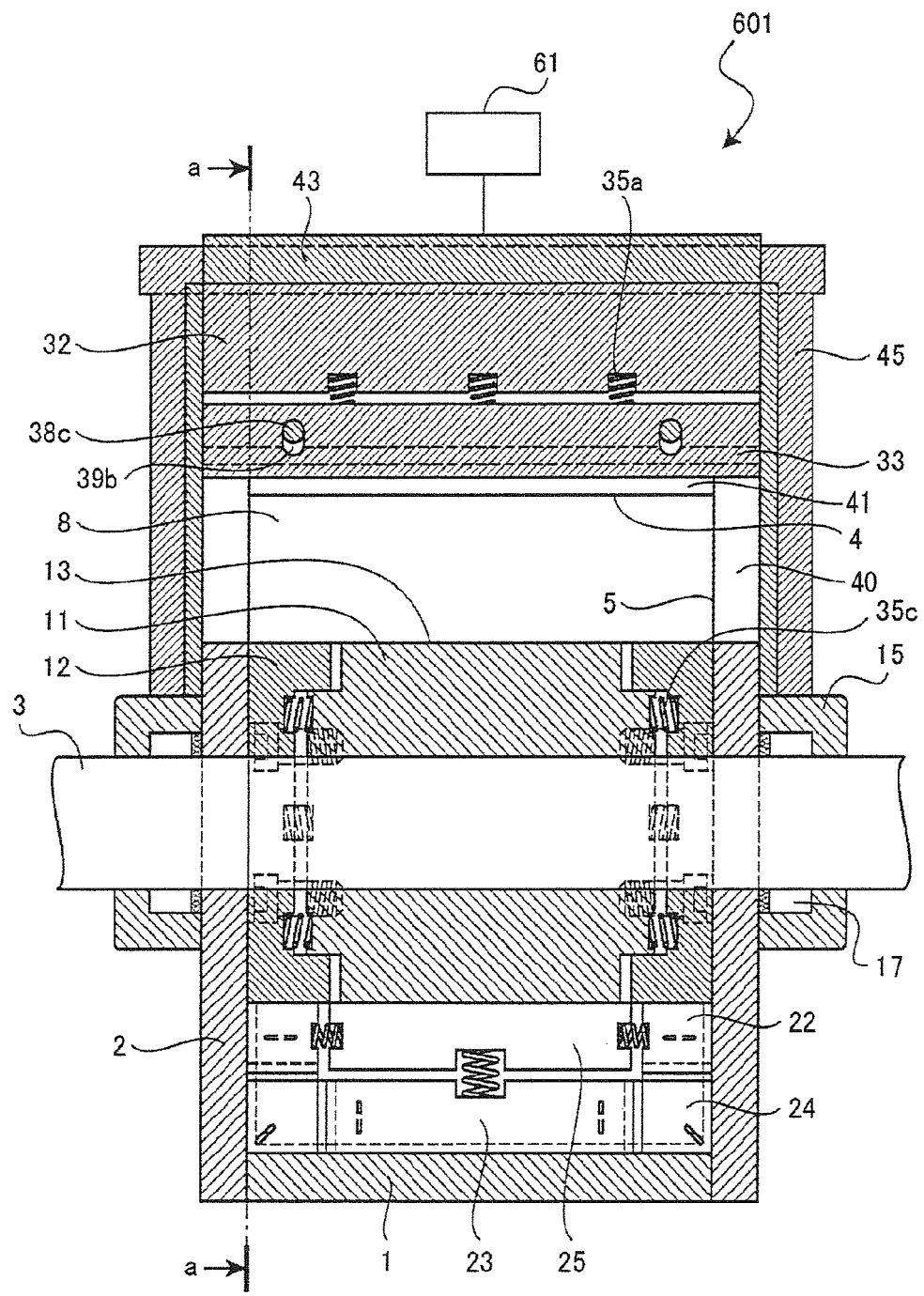
FIG. 2 is a cross-sectional view of the rotary internal combustion engine according to the first embodiment of the present invention.

FIG. 1 is a partial cross-sectional view of a rotary internal combustion engine 601 of FIG. 2 taken along a line a-a of the first embodiment of the present invention. FIG. 2 is a partial cross-sectional view of the rotary internal combustion engine 601 of FIG. 1 taken along a line b-b of the first embodiment. FIGS. 3(a) to (d) show a state of the rotation of a rotor blade 20 and the opening/closing of a shutoff valve 31 of the rotary internal combustion engine 601 of the first embodiment. FIG. 4 is an exploded perspective view of a rotor 10 of the rotary internal combustion engine 601 of the first embodiment.

As shown in FIGS. 1 and 2, in the rotary internal combustion engine 601 of the embodiment, a working shaft 3 is run concentrically through a cylinder 1 and the rotor 10 is attached to the working shaft 3 in a fixed manner. That is, in a center of the rotor 10 is formed an opened portion through which the working shaft 3 is run, whereby the rotor 10 and working shaft 3 are attached to each other in a secured manner. The rotor 10 is constructed of a rotor base 11 made up of a circular shell and a rotor blade 20 standing in a radial direction of a rotor base surrounding wall 13. The rotor base 11 and rotor blade 20 are formed integrally. Shaft bushes 15 disposed in a center of a circle of each of side lids 2 disposed on left/right end surfaces of the cylinder 1 are adapted to support the working shaft 3. Between the shaft bush 15 and working shaft 3 is provided a bearing 17 to make smooth the rotation of the working shaft 3. In a cylinder space 8, all portions including both side surfaces of the rotor base 11 and outer edge portions of the rotor blade 20 are hermetically in contact with left and right side internal walls 5 and cylinder circumferential wall 4. This contact state is maintained in any rotation angle of the rotor 10 formed by the rotation of the working shaft 3.

The shutoff valve 31 is mechanically connected to a valve reciprocating mechanism 61 via a valve attaching bar 43. The shutoff valve 31 performs intermittent movements of insertion and returning between an outside of the cylinder 1 and cylinder space 8 by a driving force of the valve reciprocating mechanism 61. At the time of being returned, the shutoff valve 31 is housed in a casing 45. In the above configuration, when the insertion of the shutoff valve 31 into the cylinder space 8 is completed, both ends of the shutoff valve 31 are hermetically held by two longitudinal valve grooves 40 formed on the side lids 2. An upper portion of the shutoff valve 31 is hermetically held by a horizontal valve groove 41 formed in the cylinder circumferential wall 41. The lower end face of the shutoff valve 31 is hermetically in contact with the rotor base surrounding wall 13, thereby making up a sliding surface of the rotor base 11.

Figure 3:
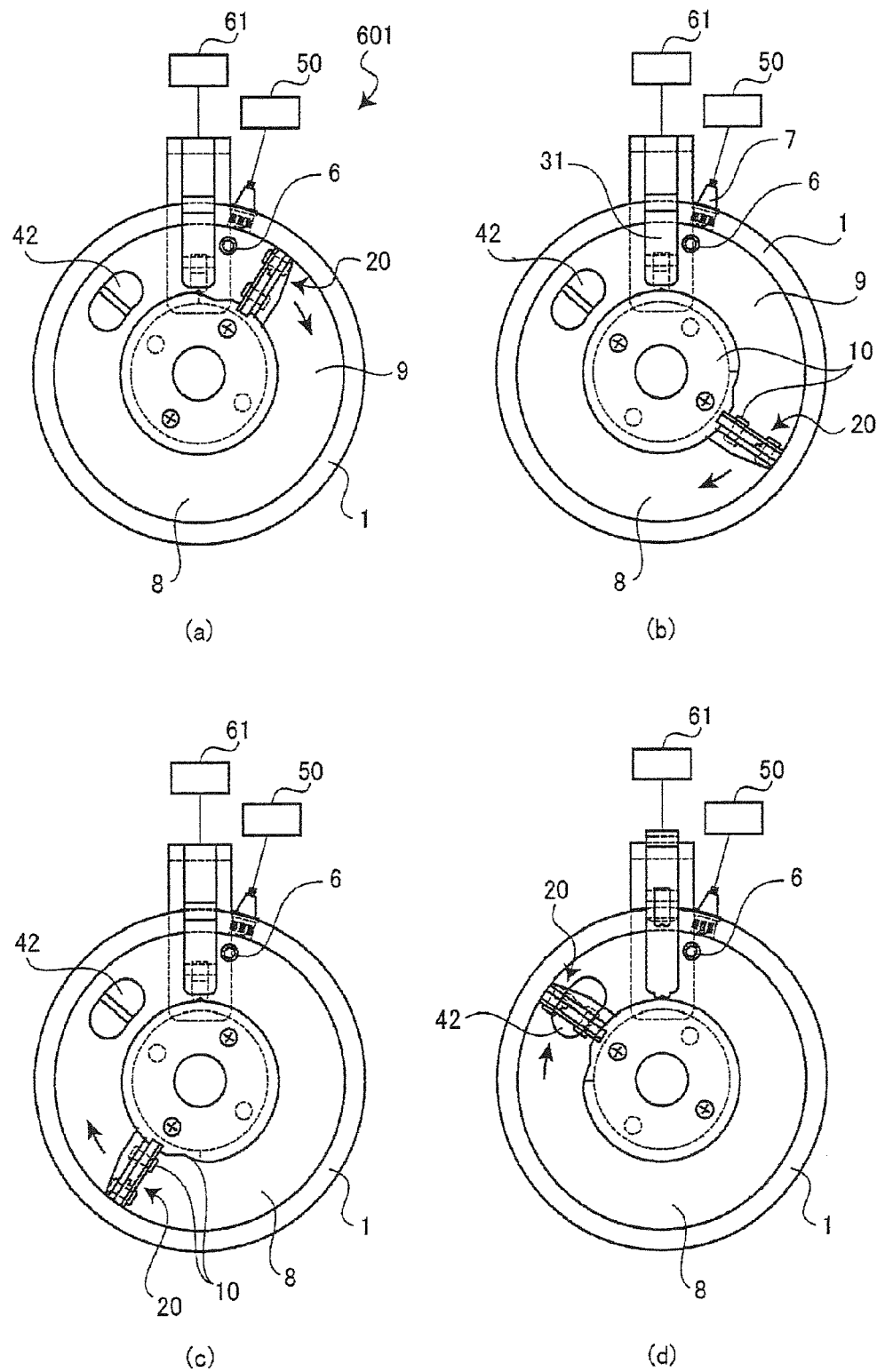
FIGS. 3(a) to (d) are a diagram showing a state of rotation and of a rotor blade and opening/closing of a shutoff valve of the rotary internal combustion engine according to the first embodiment.
Figure 4:
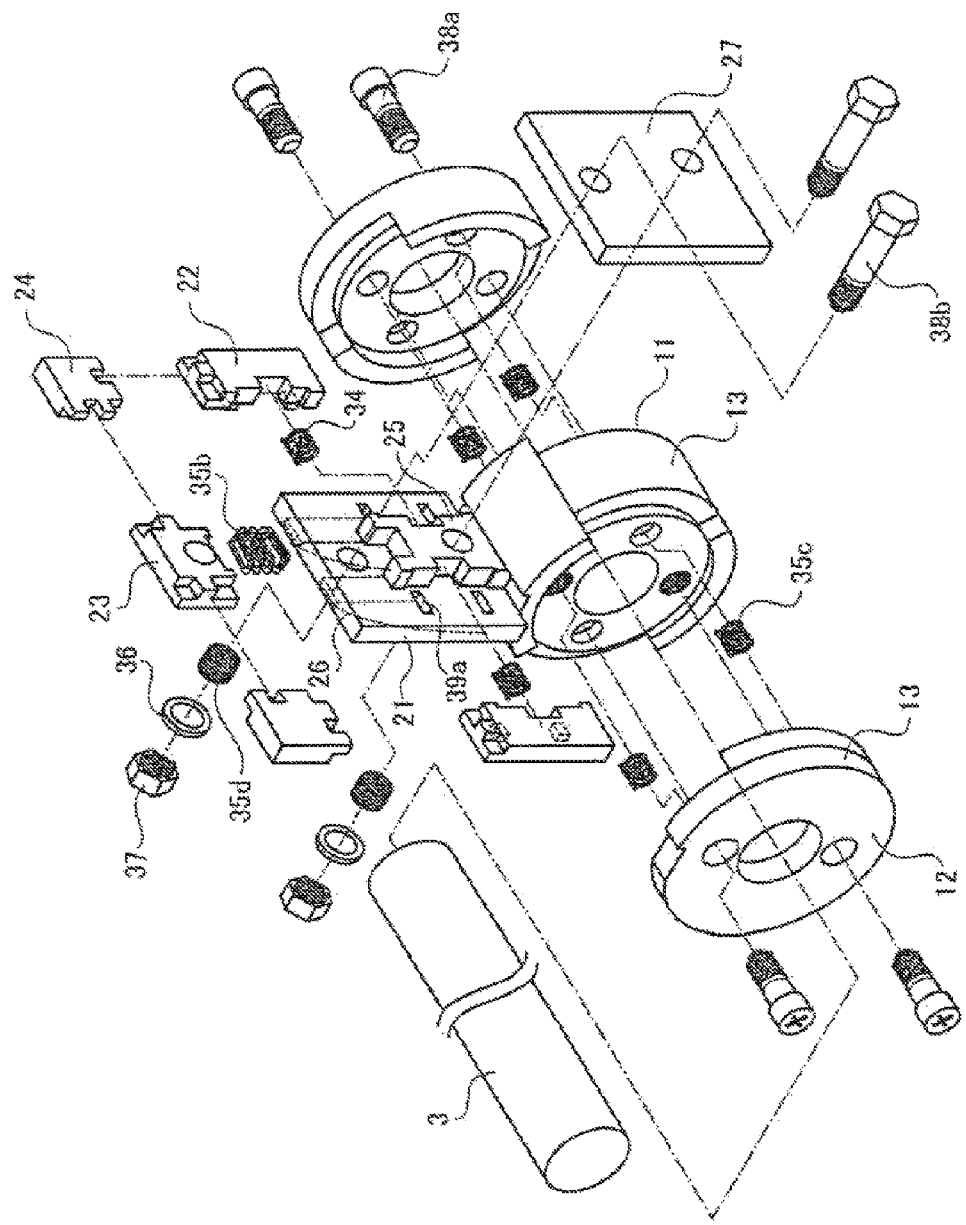
FIG. 4 is an exploded perspective view of a rotor of the rotary internal combustion engine according to the first embodiment.

In the operation of the rotary internal combustion engine 601, immediately after the rotor blade 20 passes through a position of the shutoff valve 31, the shutoff valve 31 is inserted by the valve reciprocating mechanism 61 into the cylinder space 8 and a portion of the cylinder space 8 in a radius direction is shut off (see FIG. 3(*a*)). At this point of time, compressed mixed air or compressed air and fuel are injected into the sealed layer 9, which serves as a combustion chamber 9, formed between the shutoff valve 31 and rotor blade 20 and, in the combustion chamber 9, the compressed air and fuel are ignited or fired by an ignition plug 7. Moreover, switching of ignition or firing by the ignition plug 7 is controlled by a switching pointer 50. Combustion expansion pressure generated at this time causes the rotor blade 20 to be pressed, with the shutoff value 31 as a starting point for a mechanical action, thus directly providing rotation to the working shaft 3 (see FIG. 3(*b*) and FIG. (*c*)). Then, combustion gas is released to an exhaust hole 42 formed in an appropriate position of the side internal wall 5 or cylinder circumferential wall 4 existing in a place where the rotation of the rotor 10 almost ends (see 3(*d*)) and, for preparation for a next stroke, the shutoff valve 31 is returned back by the valve reciprocating mechanism 61 to the outside of the cylinder 1, when one working stroke ends. Thus, one of the characteristics of the rotary internal combustion engine 601 is that the combustion chamber 9 is formed in the cylinder space 8 and the combustion expansion pressure provides rotation to the rotor 10 and working shaft 3, with the shutoff vale 31*a* starting point for a mechanical action. Moreover, on the exhaust hole 42, a bridging plate 29 is provided to make smooth the movement of the rotor blade 20.

As shown in FIG. 1, according to the present embodiment, at the time of insertion of the shutoff valve 31 into the cylinder space 8, in order to prevent mutual interference accidents such as fretting and/or collision occurring between a lower end face of the shutoff valve 31 and rotor base surrounding wall 13 and in order to facilitate the start of smooth sliding between the lower end face of the shutoff valve 31 and rotor base surrounding wall 13, the rotary internal combustion engine 601 has following configurations.

That is, by shortening a radial distance by a interference prevention distance H in a circular rotational angle region W of the rotor base 11 in a manner to be timed to the insertion of the shutoff valve 31 into the cylinder space 8, the rotor base surrounding wall 13 is changed to have a cam-like shape. Moreover, the shutoff valve 31 has a structure employing a so-called a "longitudinal insertion" method by which the shutoff valve 31 is inserted and withdrawn into a circumferential space of the cylinder 1 in a radial direction and, however, the shutoff valve 31, when being returned to the outside of the cylinder, rises in a state where the shutoff valve 31 faces upward, as a result, such a problem in the case of the insertion of the shutoff valve 31 as described above does not occur. Therefore, during the time while the shutoff valve 31 is returned back thereto, it is not necessary to change the shape of the rotor base surrounding wall 13 so as to have a cam-like shape. Thus, while the shutoff valve 31 is inserted into the cylinder space 8, by shortening a radial distance of the rotor base 11 to change to have a cam-like shape, shock and mutual interference between the lower end face of the shutoff valve 31 and rotor base surrounding wall 13 can be prevented, thereby, enabling smooth start of sliding between the shutoff vale 31 and rotor base surrounding wall 13.

On the other hand, as shown in FIGS. 1 and 2, according to the present embodiment, in order to prevent overheating and seizure occurring between the shutoff valve 31 and rotor base surrounding wall 13, the rotary internal combustion engine 601 has the following structure. That is, by providing an adjusting valve 33 under a valve body 32 in the shutoff valve 31 and by interposing an elastic body (plate spring may be used) such as a coil spring 35*a* between the shutoff valve 31 and rotor base surrounding wall 13, a distance between the shutoff valve 31 and rotor base surrounding wall 13 is adjusted. By configuring as above, the thermal expansion distance occurring at the time of working of the shutoff valve 31 is absorbed which enables the prevention of seizure therebetween. Also, hermeticity of the sliding face between the lower end face of the shutoff valve 31 and sliding face of the rotor base surrounding wall 13 is enhanced by stress of the coil spring 35*a* or the like.

Figure 5:
FIGS. 5 (a) to (c) are a diagram showing one example of a depth-of-cut matching method or the like according to the first embodiment.
Figure 5:
Figure 5:
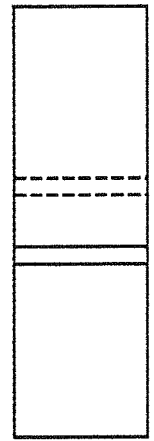

Though illustrations are simplified in FIGS. 1 and 2, a gap between the shutoff valve 31 and rotor base surrounding wall 13 is stopped up by a depth-of-cut matching method, half-lap joint matching method, and superposition method by using materials for the components so as to maintain hermeticity in the back and forth portions of the shutoff valve 31. Moreover, examples of the depth-of-cut matching method, half-lap joint matching method or the like are shown in FIGS. 5 (*a*) to (*c*). Thus, by providing the adjusting valve 33 under the shutoff valve 31 to enable the adjustment of upper and lower distances using the elastic body such as the coil spring 35*a* or the like, it is made possible to prevent seizure between the lower end face of the shutoff valve 31 and rotor base surrounding wall 13 and to achieve smooth sliding therebetween.

Figure 6:
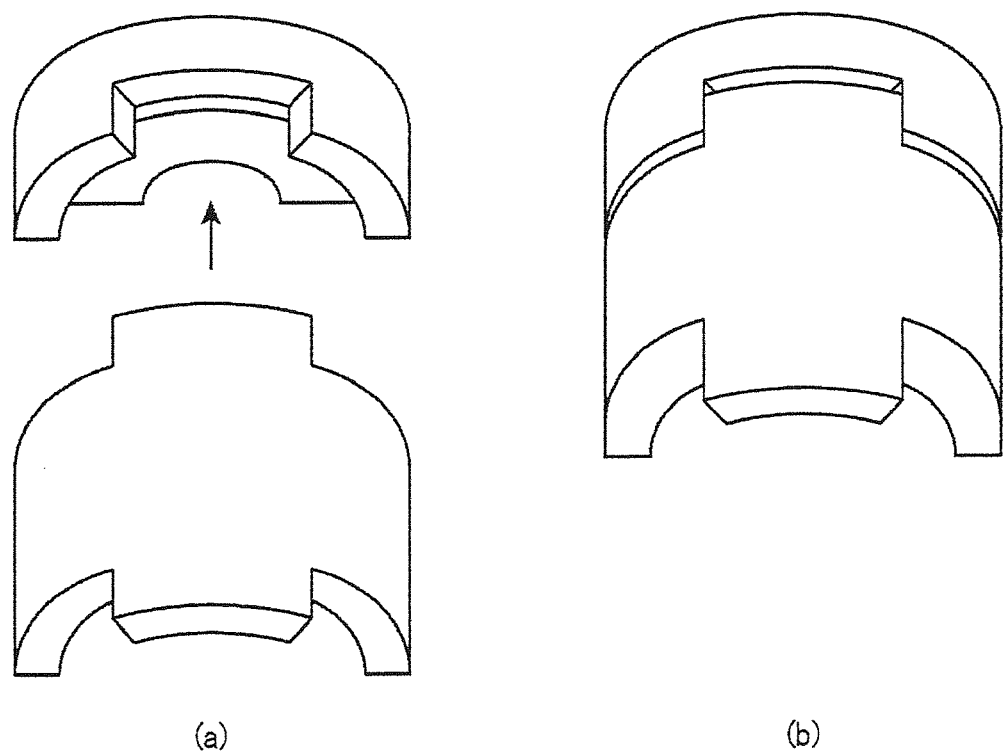
FIGS. 6 (a) and (b) are a diagram showing other examples of the depth-of-cut matching method or the like according to the first embodiment.

Furthermore, as shown in FIGS. 2 and 4, according to the present embodiment, in order to prevent overheated seizure occurring between both the side ends of the rotor base 11 and left/right side internal walls and to maintain proper contact therebetween, the rotor base 11 is divided into a plurality of portions in the left and right directions. That is, the rotor base 11 is divided so that the divided rotor bases 11 are provided on left and right sides of the rotor base 11. Then, among the divided rotor bases 11 are provided proper intervals used for the adjustment of distance of the thermal expansion distance and the left/right distances among the divided rotor bases 11 can be adjusted by using an elastic body such as a coil spring 35c or the like. Instead of the coil spring 35c, a plate spring may be used. Hermeticity in the back and forth regions of the rotor 10 can be maintained by the depth-of-cut matching method, superposition method or the like of suing materials of the components. Moreover, examples of the depth-of-cut matching method, half-lap joint matching method, or the like are shown in FIGS. 6 (*a*) and (*b*). By configuring as above, seizure between the rotor base 11 and side internal wall 5 can be prevented and proper contact with the side internal wall 5 can be properly maintained. A hole of a pin 38a of each of the side rotor bases 12 is a floating hole relative to the pin 38a attached to the rotor base 11. By configuring as above, the sliding between the left/right surfaces of the rotor 10 and contacted walls can be made smooth.

As shown in FIGS. 1, 2, and 4, in the present embodiment, the rotor blade 20 is integrally formed with the rotor base 11, however, the two components are different in shape and function from each other and each of them has its own individual measures to prevent the seizure. The top portion of the blade base plate 21 and its both side end faces are formed to have intervals for seizure prevention distance relative to the cylinder circumferential wall 4 and left/right wall 5. A rear face of the blade base plate 21 is formed so as to be plane and to have a rectangular base plate 25 directing from a lower center of the plane portion of the blade base plate 21 toward an upper portion. Side seal plates 22 are disposed in left/right portions of the blade base plate 21. On the upper portion of the blade base plate 21 is disposed a top seal plate 23. At both tangential angle portions in the upper direction are disposed corner seal plates 24. Each of the seal plates 22 to 24 is in a close contact with a facing wall so as to stop up a seizure preventing distance portion positioned between each external ends of the blade base plate 21 and each facing wall. A proper interval is provided between the internal end face of each of the above seal plates 22 to 24 and the base plate 25 and the interval is adjusted by using the coil springs 34 and 35 or plate spring or the like. Each of seal plates 22 to 24 is pushed by pressure to ensure contact between the cylinder circumferential wall 4 being facing wall relative to each of the seal plates 22 to 24 and the side internal wall 5.

By junction among the seal plates 22 to 24 using the half-lap joint matching method shown in FIGS. 6(*a*) to (*c*), hermeticity of back and forth portions of the rotor blade 20 is maintained. Each of components making up the seal plates 22 to 24 is held stably by using a pressing plate 27. That is, in a state in which each of the seal plates 22 to 24 is sandwiched between the blade base plate 21 and pressing plate 27, pins 38b is secured via coil springs 35d and nuts 36 to the bolt 37. Moreover, though not shown, it is needless to say that a small spring, which is in contact in a state of being struck, may be disposed, at an angle of 45° at a corner on the base plate side 25 of the corner seal plate 24.

By configuring as above, the distance in upper/lower and left/right directions of the rotor blade 20 is adjusted by using the coil springs 34 and 35b in a region from the seal plates 22 to 24 of the rotor blade 20 to the base plate 25 to prevent seizure between the cylinder circumferential wall 4 being a facing wall of the rotor blade 20 and the side internal wall 5 and to obtain excellent sliding between the cylinder circumferential wall 4 and side internal wall 5 while hermeticity in the back and forth regions of the rotor 10 is maintained.

Figure 7:
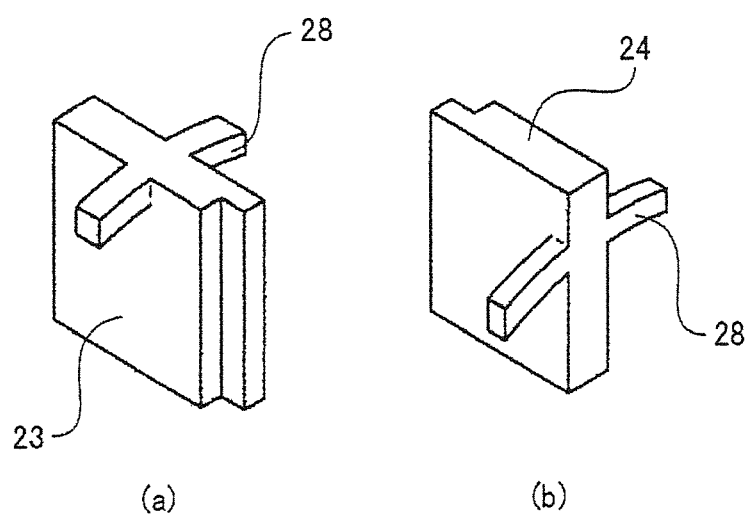
FIGS. 7 (a) and (b) are a diagram showing a configuration in which a ski is attached to a seal plate according to the first embodiment.

In order to prevent an obstacle to the rotation of the rotor 10 caused by the interference including drop or engagement of each of the seal plates 22 to 24 into or with the longitudinal valve groove 40, horizontal valve groove 41, exhaust hole 42, and an unillustrated oil collecting groove, which may occur at the time of the rotation of the rotor 10, the following configuration is employed. That is, as shown in FIGS. 7(*a*) and (*b*), each of the seal plates passing through each of the grooves or holes described above is provided with a bar called a ski 28 having an appropriate length so that each of the grooves or holes is bridged by the bar. More specifically, one configuration is shown in FIG. 7(*a*) in which the top seal plate 23 is provided with the ski 28 and another configuration is shown in FIG. 7(*b*) in which the corner seal plate 24 is provided with the ski 28. In other drawings, the illustration of the ski 28 is simplified in some cases. By providing the seal plates 22 to 24 of the rotor blade 20 with a bridging lever called the ski 28 to bridge the grooves and holes, interference between grooves or holes and seal plates can be prevented.

As described above, the rotary internal combustion engine 601 of the first embodiment of the present invention includes the cylinder 1 having the cylinder circumferential wall 4 provided with a horizontal valve groove 41 formed on an internal circumferential face, the working shaft 3 run concentrically through the cylinder 1 and held so as to freely rotate, the rotor 10 attached to the working shaft 3 made up of the rotor base 11 constructed of a circular shell and the rotor blade 20 standing in a radial direction of the rotor base surrounding wall 13, side lid 2 having the shutoff valve 31 to perform an intermittent movement of insertion and returning between the outside of the cylinder 1 and the cylinder space 8 and the longitudinal valve groove 40. In the cylinder space 8 in the cylinder 1, both the side faces of the rotor base 11 and all outer edge portions of the rotor blade 20 are hermetically in contact with the left/right walls and, when the insertion of the shutoff valve 31 into the cylinder space 8 is completed, both sides of the shutoff valve 31 are hermetically held by two longitudinal valve grooves 40 disposed on the left/right side lids 2 and further the upper portion of the shutoff valve 31 is hermetically held by the horizontal valve groove 41 having the cylinder circumferential wall 41. The lower end face of the shutoff valve 31 is hermetically in contact with the rotor base surrounding wall 13 to form a sliding face of the rotor base 11 and, immediately after the rotor blade passes through a position of the shutoff valve 31, the shutoff valve 31 is inserted into the cylinder space 8 to stop up the cylinder space 8 in a radial direction and compressed mixed air or compressed air and fuel are injected into the sealed layer, serving as the fuel chamber 9, formed between the shutoff valve 31 and rotor blade 20. The air and fuel are ignited or fired in the fuel chamber 9 and the combustion expansion pressure generated by the ignition presses the rotor blade 20 with pressure, with the shutoff valve 31 as a starting point for a mechanical action, to directly provide rotation to the working shaft 3 and the combustion gas is released into the exhaust hole 42 and then the shutoff valve 31 is returned back to the outside of the cylinder 1 for preparation of a next stroke and one working stroke now ends.

Also, according to the rotary internal combustion engine 601 of the first embodiment of the present invention, in a manner to be timed to the insertion of the shutoff valve 31 into the cylinder space 8, a radial distance in a rotation angle region W of the rotor base 11 is shortened by a distance corresponding to an interference prevention distance H and the rotor base surrounding wall 13 is changed so as to have a cam-like shape.

Also, according to the rotary internal combustion engine 601 of the first embodiment of the present invention, the shutoff valve 31 has the valve body 32 and the adjusting valve 33 disposed in a lower portion of the valve body 32 and, by interposing the elastic body between the valve body 32 and adjusting valve 33 to adjust a distance therebetween and the gap between the valve body 32 and adjusting valve 33 is stopped up by any one of the depth-of-cut matching method, half-lap joint matching method, superposition method of components making up the valve body 32 and adjusting valve 33 to enable the upper and lower distance to be adjusted.

Also, according to the rotary internal combustion engine 601 of the first embodiment of the present invention, the rotary base 11 is divided into a plurality of portions in left and right directions so that an appropriate interval exists among the divided portions and by using an elastic body among the divided portions to adjust left/right distances and hermeticity among divided portions including the back and forth portions of the rotor 10 is maintained by the depth-of-cut matching method, half-lap joint matching method, and superposition method of components making up the rotary base 11, which enables the adjustment of left/right distances.

Also, according to the rotary internal combustion engine 601 of the first embodiment of the present invention, the rotor blade 20 includes the blade base plate 21, the rectangular base plate 25 directing from a lower center of a plane portion of the rotor blade 21 upward, the side seal plates 22 disposed in the left and right directions of the base plate 25, the top seal plate 23 disposed in an upper portion of the base plate 23, and the corner seal plates 24 disposed at tangential angle portions in the upper portion of the base plate 23. The top portion and both side end faces of the blade base plate 21 are formed to have intervals for seizure between the cylinder circumferential walls 4 and left and right internal walls 5. Each of the side seal plate 22, top seal plate 23, and corner seal plate 24 stop up a portion corresponding to the seizure prevention distance between each outer end and each facing end of the blade base plate 21 and facing walls and are hermetically in contact with the facing walls. There is provided an appropriate interval between each of the internal side end faces of the side seal plate 22, top seal plate 23, and corner seal plate 24 and base plate 25 and these intervals can be adjusted by using the elastic body, and each of the seal plates 22 to 24 is pressed appropriately with pressure to ensure contacts between each of the seal plates 22 to 24 and the facing walls 4 and 5. Hermeticity of the back and forth portions of the rotor blade 20 is maintained by a junction using any one of the depth-of-cut matching method, half-lap joint matching method, and superposition method using the components for the side seal plate 22, top seal plate 23, and corner seal plate 24.

Also, according to the rotary internal combustion engine 601, each hole and each groove are bridged by at least any of the seal plates 22 to 24 using the ski 28 having a predetermined length.

Therefore, in the first embodiment of the present invention, following effects can be achieved. That is, being timed to the rotation of the rotor 10, the cylinder space 8 is shut off by the shutoff valve 31 in a radial direction and high pressure air and fuel are injected into the sealed layer, which serves as the combustion chamber 9, formed by the rotor blade 20 and shutoff valve 31 and rotation is directly provided by the combustion expansion pressure caused by the jetting air and fuel to the rotor 10 and working shaft 3, with the shutoff valve 31 as a starting point for a mechanical point. Moreover, by constructing the rotary internal combustion engine 601 which is driven by the rotation of the rotor 10 realizes the following effect. That is, in the case of the rotary internal combustion engine, since neither a rotational mechanism such as a crank nor an eccentric shaft are used and the engine is driven by a circular rotation of the rotor, movements of the engine can be simplified, resulting in loss in mechanical loss. As a special feature of the rotary internal combustion engine, high compression air, fuel, and the like are supplied from a specialized mechanism and, therefore, fuel expansion stroke is only the working stroke in the cylinder, thus preventing leakage of fuel during engine operations. Moreover, the rotary internal combustion engine can be made simple in its structure and small in its size and, therefore, the reduction in manufacturing costs and in mechanical loss, contraction of volume and weight can be achieved. The rotational direction of the rotor is the same, which causes no weight loss due to inertia. Due to decreased shock sound or friction sound during the operation of the engine, quietness can be kept. The rotary internal combustion engine, owing to its shape, is allowed to use a variety of fuels including not only gasoline or light oil but also natural gas, organic brewing fuel, heavy oil, hydrogen gas, and the like. The internal combustion engine has big and flexible capabilities to respond to a large or small scale.

The rotary internal combustion engine 601 of the first embodiment, the space surrounding the cylinder 1 is shut off and sealed by the shutoff valve 31 in a radial direction. Specifically, in order to prevent shock and mutual interference accident between the shutoff valve 31 and rotor base surrounding base 13 at the time of the insertion of the shutoff valve 31 into cylinder space, being timed to the insertion of the shutoff valve 31, the radial distance of the rotor base 11 is shortened to change so as to have a cam-like shape so that shock and interference between the lower end face of the shutoff valve 31 and the rotor base surrounding wall 13 is avoid, thereby achieving mutual smooth start of sliding.

Moreover, by attaching the adjusting valve 33 under the shutoff valve 31, the adjustment of the upper and lower distance between the shutoff valve 31 and rotor base surrounding wall 13 is made possible by using the elastic body such as the coil spring and, as a result, seizure between the lower end face of the cutoff valve 31 and the rotor base surrounding wall 13 is prevented and smooth sliding therebetween can be achieved.

In order to prevent overheating and seizure between the rotor 10 and cylinder circumferential wall 4 and side internal wall 5 coming in contact with each of left/right side faces of the rotor base 11, the rotor 10 is divided into a plurality of portions in left and right directions and the distance in the left and right directions is adjusted by using the spring or the like disposed in a gap among the divided portions and sliding between each of the left/right side faces of the rotor 10 described above and the contacting wall is smoothed.

Also, by adjusting the up/down and left/right distances of the rotor blade 20 by using a coil spring or the like between the seal plates 22 to 24 of the rotor blade 20 and the base plate 25, seizure between the rotor blade 20 and facing walls is prevented and excellent sliding between the rotor blade 20 and facing walls is obtained while still maintaining hermeticity in the forth and back portions of the rotor 10.

By providing a bridging lever called the ski 28 to seal plates 22 to 44 of the rotor blade 20, grooves and/or holes are bridged and mutual interference between the grooves an/or holes can be prevented.

Second Embodiment

Figure 8:
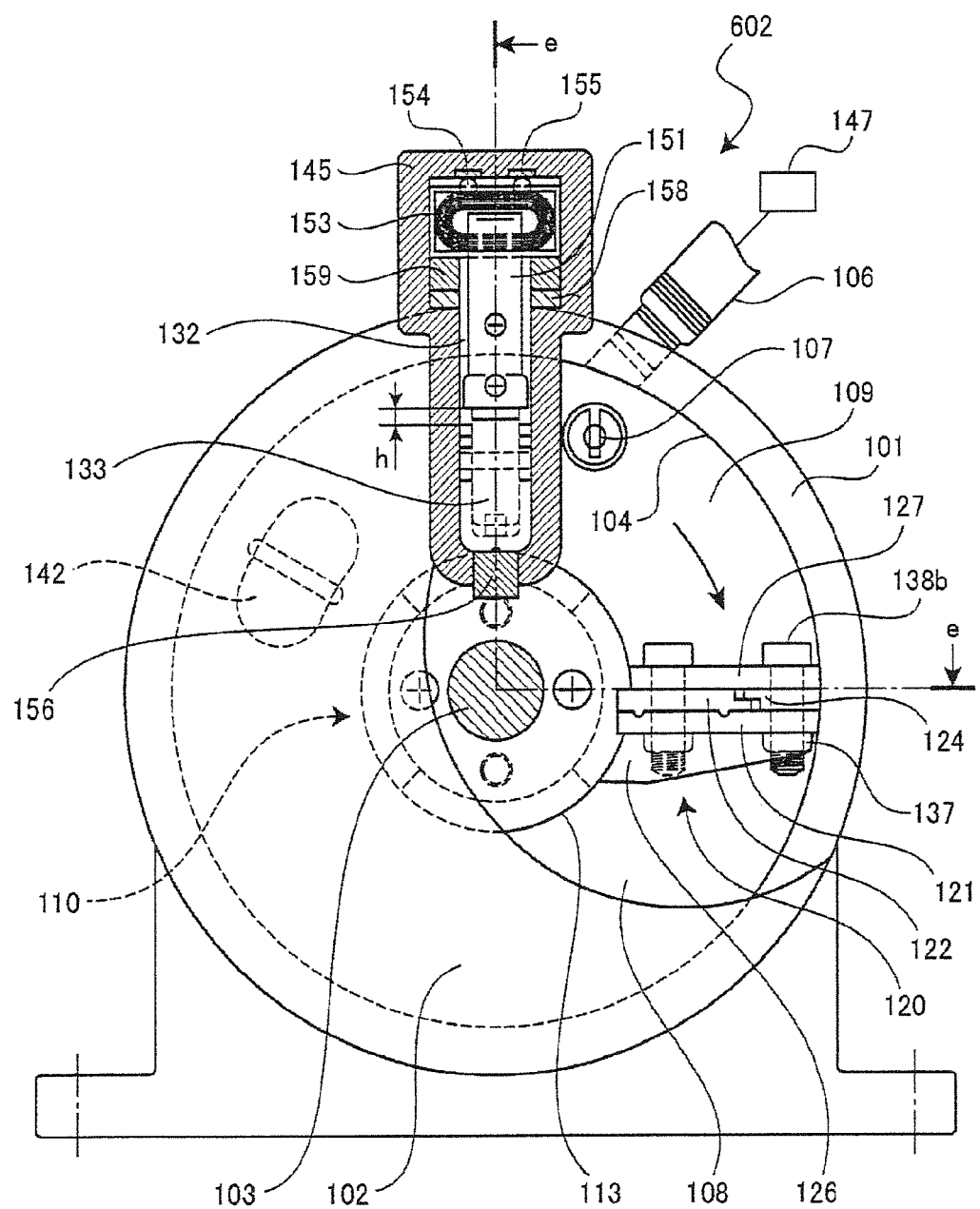
FIG. 8 is a partial cross-sectional diagram of a rotary internal combustion engine according to a second embodiment.
Figure 9:
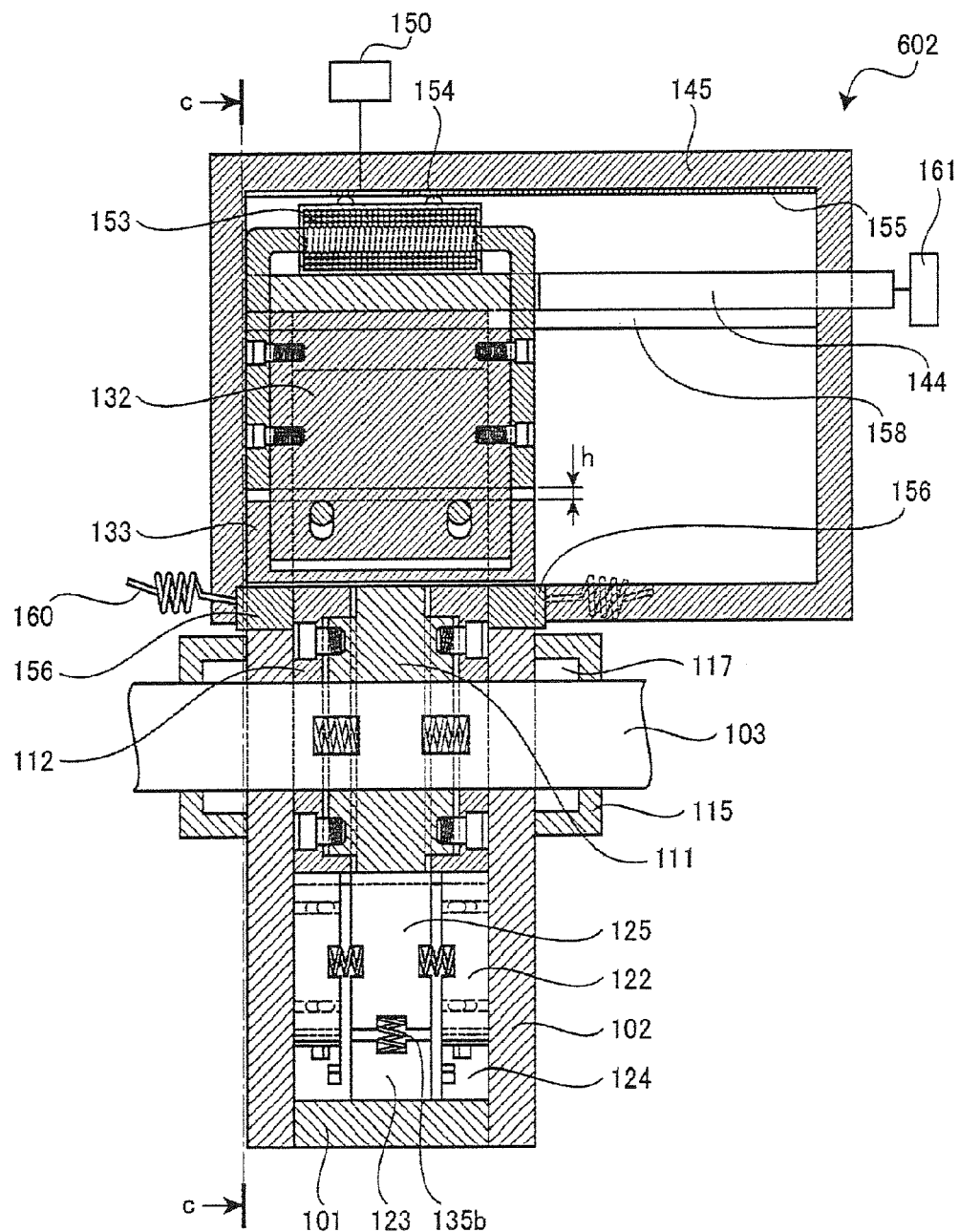
FIG. 9 is a partial cross-sectional diagram of a rotary internal combustion engine according to the second embodiment.

FIG. 8 is a cross-sectional view of a rotary internal combustion engine 602 of FIG. 9 taken along a line c-c according to the second embodiment of the present invention. FIG. 9 is a cross-sectional view of the rotary internal combustion engine 602 of FIG. 8 taken along a line e-e according to the second embodiment.

As shown in FIGS. 8 and 9, in the rotary internal combustion engine 602 of the second embodiment, a working shaft 103 is run concentrically through a cylinder 101 and the rotor 110 is attached to the working shaft 103 in a fixed manner. The rotor 110 includes a rotor blade 120 standing in a radial direction of a rotor base 111 made up of a circular shell and rotor base circumferential wall 113. The rotor base 111 and rotor blade 120 are formed integrally. A shaft bush 115 disposed in a center of a circle of each of side lids 2 attached to left/right end surfaces of the cylinder 101 supports the working shaft 103. Bearings 117 are provided between the shaft bush 115 and working shaft 103 to make the rotation of the working shaft 103 smooth. The shutoff valve 131 is mechanically connected via a valve pressing bar 144 to a valve reciprocating mechanism 161. A flat shaft bush 158 is provided to smooth the operations of the shutoff valve 131 by using a valve pressing bar 144. The shutoff valve 131 performs intermittent movements of insertion and returning between the outside of the cylinder 101 and cylinder space 108 by using driving force of the valve reciprocating mechanism 161. The shutoff valve 131, after the returning, is housed in a casing. The upper portion of the shutoff valve 131 is hermetically held in the horizontal valve groove formed in the cylinder circumferential wall 113 and the lower end face of the shutoff valve 131 is hermetically in contact with the rotor base surrounding wall 113 described above to form a sliding face of the rotor base 111.

When the rotary internal combustion engine 602 is driven, the rotor blade 120 passes through the position of the shutoff valve 131 and, then immediately, the shutoff valve 131 is inserted by the valve reciprocating mechanism 161 into the cylinder space 108 to stop up the cylinder space 108 in a radial direction. The compressed mixed air or compressed air and fuel are injected by a jetting nozzle 106 facing the cylinder space 108 into a sealed layer serving as a combustion chamber 109 formed between the shutoff valve 131 and rotor blade 120 and the compressed air and fuel supplied from a compressed mixed air supplying mechanism 147 are ignited or fired by an igniting plug 107 in the combustion chamber 109. The combustion expansion pressure presses the rotor blade 120, with the shutoff vale 131 as a starting point for a mechanical action, to directly provide rotation to the working shaft 103. Then, combustion gas is released into an exhaust hole 142 formed in an appropriate position of the side internal wall 5 or cylinder circumferential wall 4 existing in a place where the rotation of the rotor almost ends and, for preparation for a next stroke, the shutoff valve 131 is returned back by the valve reciprocating mechanism 161 to the outside of the cylinder 101, when one working stroke ends. In the second embodiment, the combustion chamber 109 is formed in the cylinder space 108 and combustion expansion pressure generated in the combustion chamber 109 directly provides rotation to the rotor 110 and working shaft 103, with the shutoff valve 131 as a starting point for a mechanical action.

On the other hand, a back face of the blade base plate 121 is formed so as to be plane and to have a rectangular base plate 125 directing from a lower center of the plane portion of the blade base plate 121 upward portion. Side seal plates 22 are disposed in left/right portions of the blade base plate 21. On the upper portion of the blade base plate 21 is disposed a top seal plate 23. At both tangential angle portions in the upper direction are disposed corner seal plates 24. Each of the seal plates 22 to 24 is in a close contact with each of facing walls so as to stop up a seizure preventing distance portion positioned between each external end of the blade base plate 21 and each of the facing walls. A proper interval is provided between the internal end face of each of the above seal plates 122 to 124 and the base plate 125 and the interval is adjusted by using the coil springs 135. At the same time, each of seal plates 122 to 124 is pushed with pressure to ensure mutual contact between each of the seal plates 122 to 124 and the cylinder circumferential wall 104. In a state where the base plate 125 and each of the seal plates 122 to 124 are sandwiched between the blade base plate 121 and pressing plate 127, the pin 138*b* is secured to the bolt 137.

Then, particularly, in the second embodiment, at the time of insertion of the shutoff valve 131 into the cylinder space 8 and returning back to the outside of the cylinder 101, in order to prevent contact interference such as fretting and/or collision occurring between a lower end face of the shutoff valve 131 and rotor base surrounding wall 13, the rotary internal combustion engine has following configurations. That is, a lift electromagnet 151 is mounted on an upper end of the shutoff valve 131. Two poles of the lift electromagnet 151 are hanging from left/right side faces of the shutoff valve 131 so that its lower end face is set to be positioned apart from left/right upper portions of the adjusting valve 133 by an interference prevention distance h. The switching of currents for the lifting electromagnet 151 is performed by a switching pointer 150, electronic control, or the like. Power is supplied to an electromagnet coil 153 via an electrode 154 from a wiring 155.

By configuring as above, at the time of the insertion of the shutoff valve 131 into the cylinder space 108, while a state in which the adjusting vale 133 is being lifted by interference prevention distance h by applying power is kept, that is, while a distance between the adjusting valve 133 and rotor base surrounding wall 113 is maintained, the shutoff valve 131 is inserted into the cylinder space 108. Then, being timed to the completion of the insertion of the shutoff valve 131, supply of power to the lifting electromagnet 151 is stopped. When the adjusting valve 133 drops due to the stop of power supply, by applying power, via the wiring 160, to a suction electromagnet 156 disposed in a lower portion of a longitudinal vale groove, a lower end surface of the adjusting valve 133 is sucked by stress of the suction electromagnet 156 to facilitate the drop of the adjusting valve 133. The sliding between the lower end face of the shutoff valve 133 and rotor base surrounding wall 113 is stably maintained. Moreover, at the time of returning of the shutoff valve 131 to the outside of the cylinder 101, power supply to the suction electromagnet is stopped and, at the same time, power is supplied to the lifting electromagnet 151 and the adjusting valve 133 is lifted by the interference prevention distance h to return the shutoff valve 131 to the outside of the cylinder 101. The switching of currents to the suction electromagnet 156 is performed by the switching pointer 150, electronic control, or the like.

As described above, the rotary internal combustion engine 602 of the second embodiment includes the lifting electromagnet 151 disposed on a top portion of the shutoff valve 131 and the suction electromagnet 156 disposed in the lower portion of the longitudinal valve groove. Two poles of the lift electromagnet 151 are hanging from left/right side faces of the shutoff valve 131 so that its lower end face is set to be positioned apart from left/right upper portions of the adjusting valve 133 by an interference avoidance distance h. At the insertion of the shutoff valve 131 into the cylinder space 108, while a state in which the adjusting valve 133 is lifted by the interference prevention distance h by supplying power to the lift electromagnet 151 is being kept, the shutoff valve 131 is inserted into the cylinder space 108 and, being timed to the completion of the insertion of the shutoff valve 131, power supply to the lifting electromagnet 151 is stopped to allow the shutoff valve 133 to drop. At the same time, by applying power to the suction electromagnet 156, the lower end of the adjusting valve 133 is sucked by stress of the suction electromagnet 156 and the drop of the adjusting valve 133 is facilitated to maintain stable sliding between the lower end face of the adjusting valve 133 and the rotor base surrounding wall 113. At the time of the returning of the shutoff valve 131 to the outside of the cylinder 101, by stopping power supply to the suction electromagnet 156 and, at the same time, by applying power to the lifting electromagnet 151 to lift the adjusting valve 133 by the interference prevention distance h, the shutoff valve 131 is returned back to the outside of the cylinder 101.

Therefore, according to the second embodiment, the adjusting valve 133 can be moved up and down relative to a valve body 132 of the shutoff valve 131 by using two electromagnets 151 and 156. When the shutoff valve 131 is inserted into the cylinder 101 or returned back from the cylinder 101, by using the lift electromagnet 151, the adjusting valve 133 is lifted and, at the time of the completion of the insertion, by applying power to the suction electromagnet 156 disposed in the lower portion of the longitudinal valve groove, the adjusting vale 133 is lowered, which causes the lower end face of the adjusting valve 133 and rotor base surrounding wall 113 to be slid smoothly and rapidly. That is, at the time of the insertion or returning of the shutoff valve 131, the interference between the adjusting valve 133 and rotor base surrounding wall 113 can be removed.

Moreover, the method of inserting the shutoff valve 131 into the cylinder 101 shown in FIGS. 8 and 9 is referred to as so-called "horizontal insertion" method in which the shutoff valve 131 is inserted and drawn in a direction of a radius direction and orthogonal direction of the cylinder 101. However, the insertion method of the shutoff valve 131 has a variety, for example, the method also includes a method by which an arc-shaped valve is inserted while the valve is rotating. The electromagnet is named for the convenience of explanation and the name has nothing to do with its nature. The switching of currents of the lifting electromagnet 151 and suction electromagnet 156 is performed by the switching point 150, electronic control, or the like.

Third Embodiment

Figure 10:
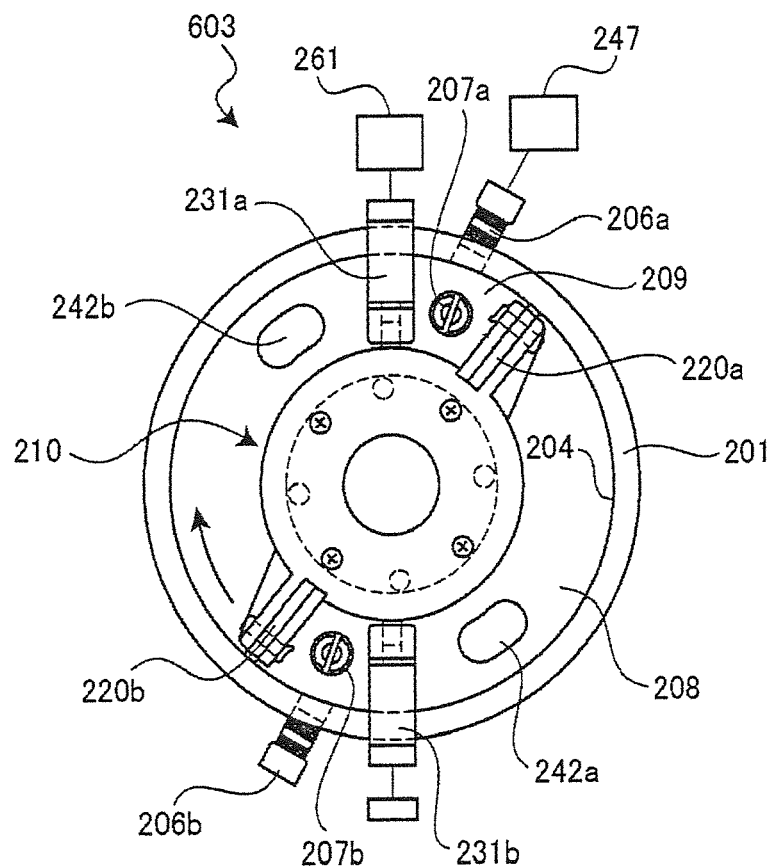
FIG. 10 is a partial cross-sectional diagram of a rotary internal combustion engine according to a third embodiment.
Figure 11:
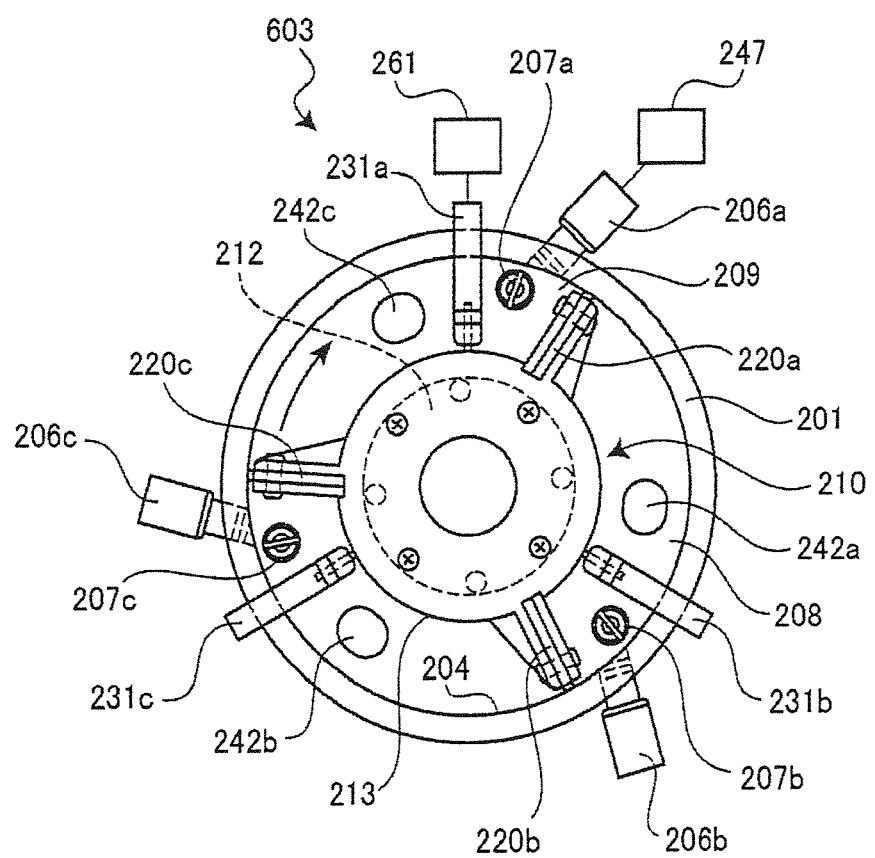
FIG. 11 is a partial cross-sectional diagram of a rotary internal combustion engine according to the third embodiment.

FIG. 10 is a partial cross-sectional diagram of a rotary internal combustion engine 604 of the third embodiment of the present invention. FIG. 11 is a partial cross-sectional diagram showing an improved example of the rotary internal combustion engine.

As shown in FIG. 10, the rotary internal combustion engine 603 has two shutoff valves 231a and 231b to be controlled by a valve reciprocating mechanism 261. Further, in a cylinder 201, a rotor 210 has two rotor blades 220a and 220b and all components required to perform one working stroke for every one-half rotation of the rotor 210 are provided in which one working stroke includes operations of the shutoff valve 231a and 231b, jetting nozzles 206a and 206b, ignition plugs 207a and 207b, exhaust holes 242a and 242b, and the like. For every one-half rotation of the rotor 210, two working strokes are completed. Moreover, compressed mixed air is supplied from a compressed mixed air supply mechanism 247.

As shown in FIG. 11, the rotary internal combustion engine 603 is equipped with three shutoff valves 231a, 231b, and 231c controlled by a valve reciprocating mechanism 261. In the cylinder 201, the rotor 210 has three rotor blades 220a to 220c and there are all components required to perform one working stroke for every one-third rotation of the rotor 210 in which one working stroke includes operations of the shutoff valve 231a to 231c, jetting nozzles 206a and 206c, ignition plugs 207a to 207c, exhaust holes 242a to 242c and the like. For every one-third rotation of the rotor 210, three working strokes are completed. Moreover, the compressed mixed air is supplied from the compressed mixed air supply mechanism 247.

That is, the rotary internal combustion engine 603 of the third embodiment is characterized in that the rotor 210 has X (X=1, 2, . . . ) pieces of the rotor blades and, for every one-Xth rotation of the rotor 210, one working stroke is completed. Moreover, in the third embodiment of the present invention, an upper portion of the shutoff valve 231 (231a, 231b, . . . ) is hermetically held in a horizontal valve groove formed in a cylinder circumferential wall 204 and a lower end face of the shutoff valve 231 (231a, 231b, . . . ) is hermetically held in a rotor base surrounding wall 213 to form a sliding face of a rotor base 211 formed integrally with a side rotor base 212.

Working of one stroke is equivalent to working of one cylinder of a reciprocating engine and, therefore, a plurality of working is simultaneously performed in one cylinder contributes to contraction in volume in an internal combustion engine 603. The internal combustion engine is allowed to design so that working distance is matched to combustion distance depending on a difference in a kind and quality of fuel.

As described above, the rotary internal combustion engine 603 of the third embodiment is characterized in that the rotor 210 has X (X=1, 2, 3 . . . ) pieces of the rotor blades (220a, 220b, . . . ) and there are all components required to perform one working stroke for every one-half rotation of the rotor 210 in which one working stroke includes operations of the shutoff valve 231a, 231b, . . . , jetting nozzles 206a, 206b, . . . , ignition plugs 207a, 207b, . . . , exhaust holes 242a, 242b, . . . , and the like and, for every one-Xth rotation of the rotor 210, one working stroke is completed.

Therefore, according to the third embodiment, in the cylinder 201, the rotor 210 has a plurality of the rotor blade 220. An angle obtained by dividing one rotation angel of the rotor 210, that is, 360° by the number of the rotor blades 220 is defined as one working angle, at one working angle, working stroke having the same number as the number of the rotor blades 220 is completed. This enables the volume of the cylinder 201 to be effectively used and, as a result, the setting of a working distant being suitable to the combustion distance of fuel.

Fourth Embodiment

Figure 12:
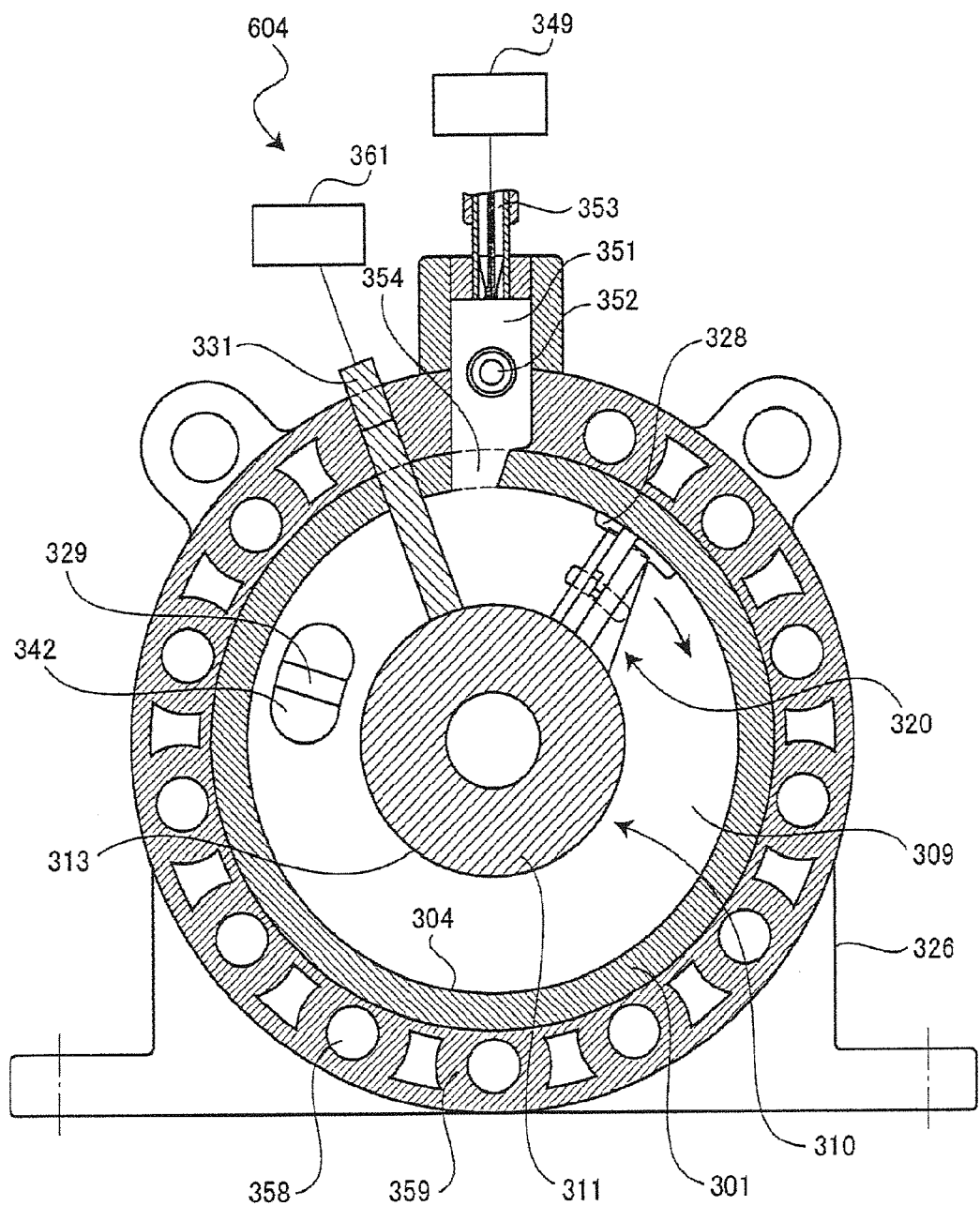
FIG. 12 is a partial cross-sectional diagram of a rotary internal combustion engine according to a fourth embodiment.
Figure 13:
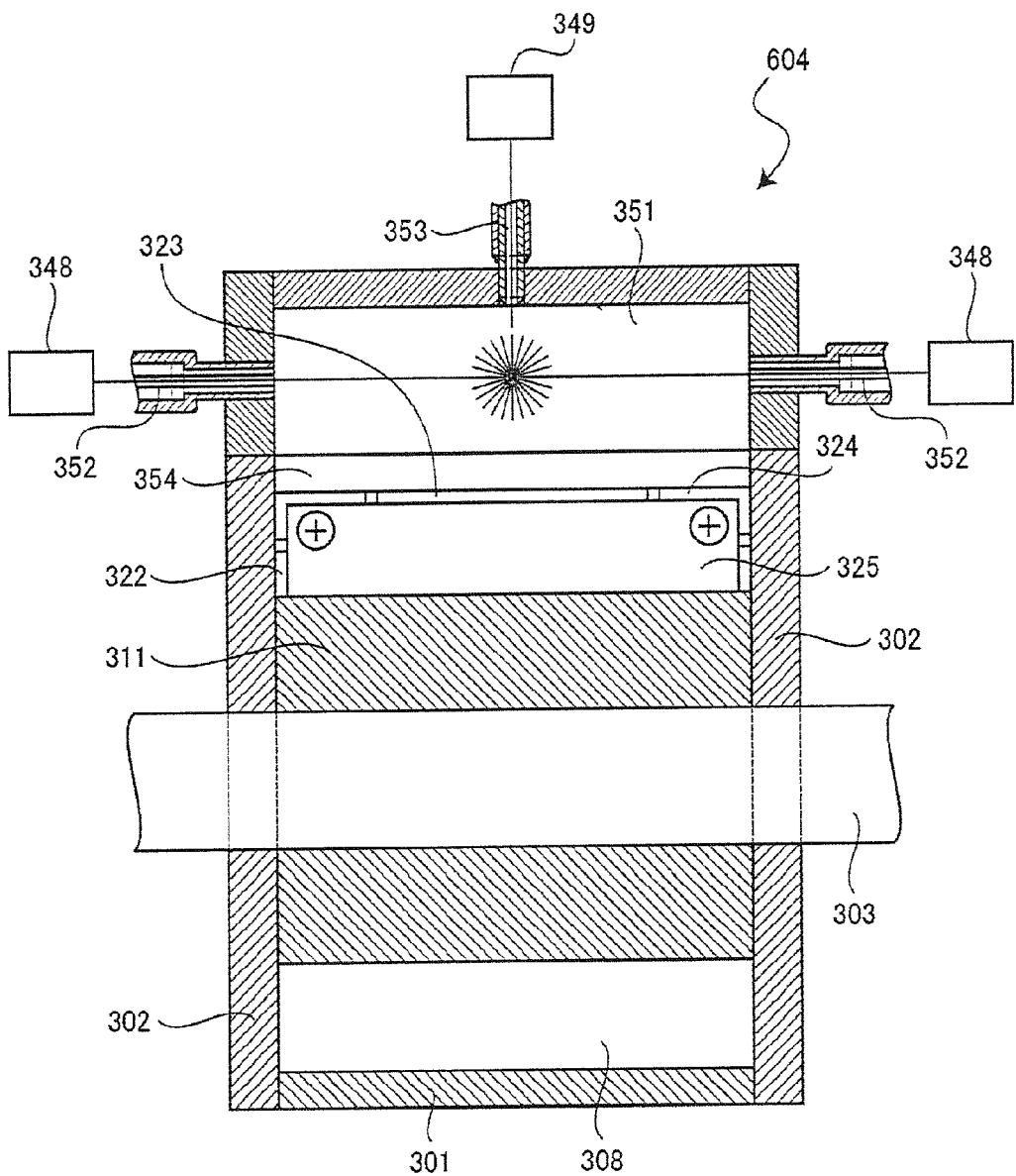
FIG. 13 is a partial cross-sectional diagram of a rotary internal combustion engine according to the fourth embodiment.

FIG. 12 is a partial cross-sectional view showing a rotary internal combustion engine 604 of the fourth embodiment of the present invention. FIG. 13 is also a partial cross-sectional view showing, in detail, configurations of components surrounding a sub-combustion chamber 352 of the fourth embodiment.

As shown in FIGS. 12 and 13, in the rotary internal combustion engine 604, a working shaft 303 is run concentrically through a cylinder 301 and a rotor 310 is attached to the working shaft 303 in a fixed manner. The rotor 310 includes a rotor base 311 made up of a circular shell and a rotor blade 320 standing in a radial direction of a rotor base surrounding wall 313. The rotor base 311 and rotor blade 320 are formed integrally. An upper portion of the shutoff valve 331 driven by a valve reciprocating mechanism 361 is hermetically held in a horizontal value groove formed in a cylinder circumferential wall 304 and a lower end face of the shutoff valve 331 is hermetically in contact with a rotor base surrounding wall 13 to form a sliding face of the rotary base 311. The rotor blade 320 has a base plate 325. The base plate 325 is provided with side seal plates 322 on its left/right portions and with a top seal plate 323 in its upper portion and with a corner seal plate 324 at a tangential angle portion in the upper portion and with a top seal plate 323 in its upper portion. In a partial portion of the seal plate 323, a bar called a ski 328 as described in the first embodiment is also provided.

In the fourth embodiment, the rotary internal combustion engine 604 has a sub-combustion chamber 351 disposed on an outside of the cylinder 301 in a forth direction of a shutoff valve 331 and two high-pressure air nozzles 352 in a manner to face each other. Further, a fuel nozzle 353 is attached in a manner to face a portion toward which fuel is injected from high-pressure air nozzles 352. At the time of operations of the rotary internal combustion engine 604, high-pressure air supplied via the two high-pressure air nozzles 352 from a high-pressure air supplying mechanism 348 is injected. Being timed to the injection, fuel supplied from a fuel supplying mechanism 349 is injected from a fuel nozzle 353. Air and fuel injected from the three nozzles 352 to 353 are mixed and stirred therein, resulting in natural firing. The jet of a frame reaches cylinder space 308 through a connecting port 354 and is then injected into a combustion chamber 309 formed between the shutoff valve 331 and rotor 310 and the combustion expansion pressure generated therein presses the rotor blade 320 with pressure, with the shutoff valve 331 as a starting point for a mechanical action, to provide the rotation to a working shaft 303. Then, combustion gas is released to an exhaust hole 342 in an appropriate position existing in a place where the rotation of the rotor 310 almost ends and, for preparation for a next stroke, the shutoff valve 331 is returned back by a valve reciprocating mechanism 361 to the outside of the cylinder 301, when one working stroke ends. A bridging plate 329 to let the rotor blade 320 smoothly pass through is formed on the exhaust hole 342. In the present embodiment, water cooling is used and, therefore, a water channel 358 to make cooling water pass through is provided. The reference number 326 is a rib for attaching machinery.

As shown above, the rotary internal combustion engine 604 of the fourth embodiment includes a cylinder 301 circumferential wall 304 having a horizontal valve groove in its inner circumferential face, the working shaft 303 concentrically run through the cylinder 301 so as to freely rotate, the rotor 310 having a rotor base 311 made up of a circular shell and the rotor blade 320 standing in a radial direction of a rotor base surrounding wall 313 and being secured to the working shaft 303, the shutoff valve 331 to perform intermittent movements of insertion and returning between the outside of the cylinder 301 and cylinder space 308, the sub-combustion chamber 351 disposed outside of the cylinder 301 and in the forth direction of the shutoff valve 331, two high-pressure air nozzle 352 mounted in the sub-combustion chamber 351 in a manner to face each other, and the fuel nozzle 353 attached so as to face a portion toward which air is injected from the high-pressure air nozzle 352. In the cylinder space 308 in the cylinder 301, all portions including both side surfaces of the rotor base 11 and outer edge portions of the rotor blade 20 are hermetically in contact with left and right side internal walls 5 and cylinder circumferential wall 304. After the completion of insertion of the shutoff valve 331 into the cylinder space 308, both sides of the shutoff valve 331 are hermetically held into two longitudinal valve grooves formed in left and right side lids and the upper end portion of the shutoff valve 331 is hermetically held to a horizontal valve groove in the cylinder circumferential wall 304 and, further, a lower end face of the shutoff valve 331 is hermetically in contact with the rotor base surrounding wall 313 to form a sliding surface of the rotor base 311 and, in the sub-combustion chamber 351, gas injected from the two high-pressure air nozzles 352 disposed in a manner to face each other and fuel nozzles 353 is mixed and stirred and then ignited.

Therefore, in the fourth embodiment, in the sub-combustion 351, gas injected by the two high-pressure air nozzles 352 disposed in a manner to face each other and the fuel nozzle 353 is mixed and stirred, resulting in ignition. In the sub-combustion chamber 351, air and fuel are simultaneously stirred and mixed which ensures combustion. Even in the case of using slow combustion oil, fuel is ignited or fired in the sub-combustion chamber 351 and a jet of flame is injected into a sealed layer in the cylinder 301 and, therefore, kinds of fuel properties that can be used in this rotary internal combustion engine 604 can be widened, for example, to even low combustible oil.

Fifth Embodiment

Figure 14:
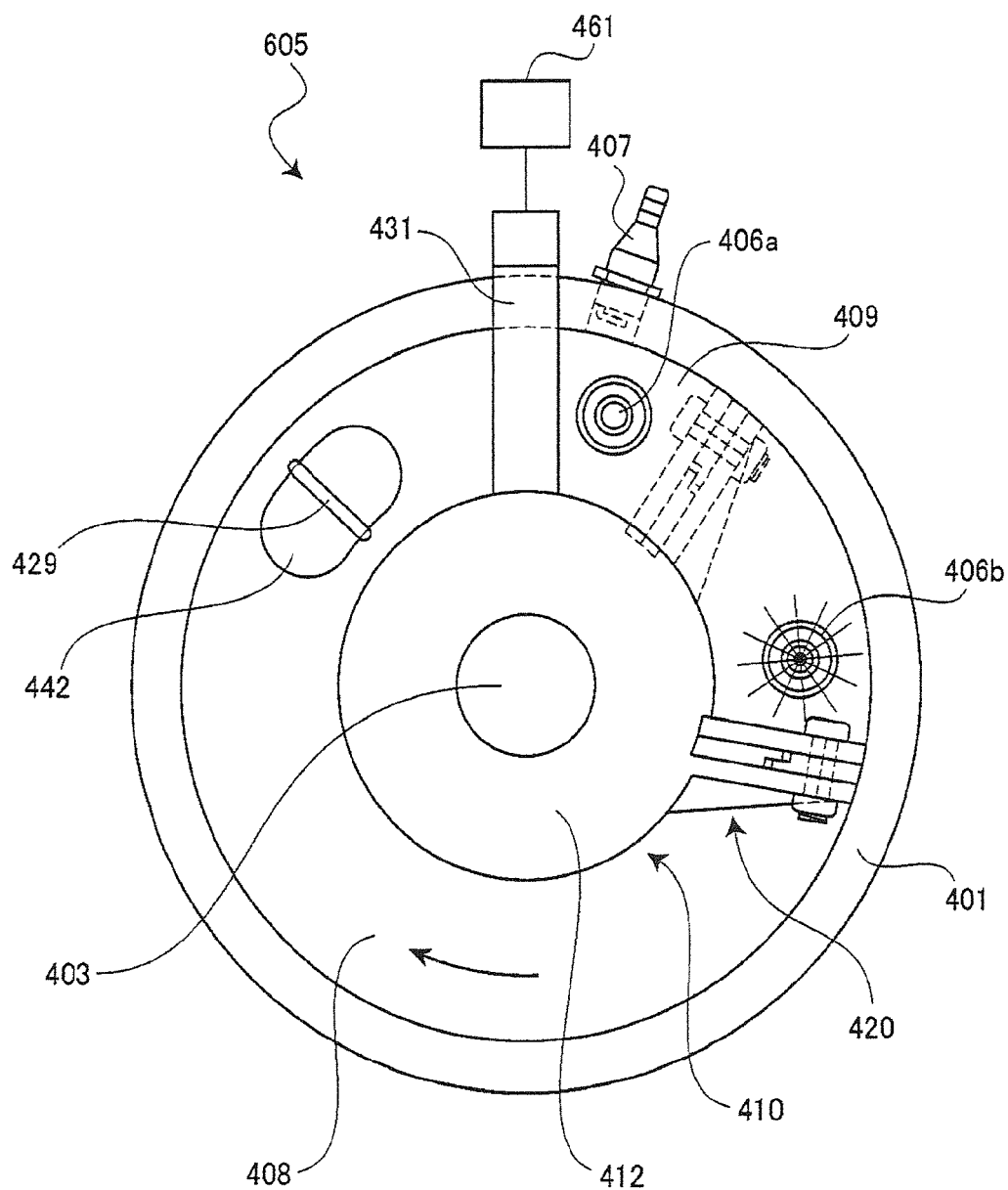
FIG. 14 is a partial cross-sectional diagram of a rotary internal combustion engine according to a fifth embodiment.

FIG. 14 is a partial cross-sectional view of a rotary internal combustion engine 605 of the fifth embodiment of the present invention. As shown in FIG. 14, the rotary internal combustion engine 605 is characterized in that, by proper positioning of a working angle suitably corresponding the travel of a rotor 410 relative to a shutoff valve 431 and by providing a plurality of jetting nozzles 406a and 406b in a manner to face a cylinder space 408 and by injecting, from each of jetting nozzles 406a and 406b, high-pressure air, fuel, and mixed air into a fuel chamber 409 being a sealed layer formed between the shutoff valve 431 and rotor blade 420 at the time of working, the support of combustion can be realized and working force can be enhanced.

In the operations of the rotary internal combustion engine 605, when the rotor blade 420 passes through a position of the shutoff valve 431, the shutoff valve 431 is immediately inserted by a valve reciprocating mechanism 461 into the cylinder space 408 and the space in a radial direction is shut off. Then, a sealed layer formed between the shutoff valve 431 and rotor blade 420 is used as a combustion chamber 409 and compressed mixed air or compressed air and fuel are injected from the jetting nozzles 406a and 406b facing the cylinder space 408 and the fuel is ignited or fired in the fuel chamber 409. The combustion expansion pressure generated by the ignition or firing presses the rotor blade 420 to directly provide rotation to the working shaft 3, with the shutoff valve 431 as a starting point for a mechanical action. Then, combustion gas is released to an exhaust hole 442 formed in a place where the rotation of the rotor almost ends and, for preparation for next stroke, the shutoff valve 431 is returned back by the valve reciprocating mechanism 461 to the outside of the cylinder 401, when one working stroke ends. Moreover, on the exhaust hole 442 is formed a bridging plate 429 so that the rotor blade 442 can pass through smoothly.

As shown as above, the rotary internal combustion engine 605 of the fifth embodiment of the present invention is characterized in that, the working angle suitably corresponding the travel of the rotor 410 relative to the shutoff valve 431 is properly positioned and a plurality of jetting nozzles 406a and 406b is provided in a manner to face a cylinder space 408 and, from each of jetting nozzles 406a and 406b, each of high-pressure air, fuel, and mixed air are injected into the fuel chamber 409 being the sealed layer formed between the shutoff valve 431 and rotor blade 420 at the time of working.

Therefore, according to the fifth embodiment, by providing a plurality of jetting nozzles 406a and 406b at a appropriate place where a working angle for the shutoff valve 431 is changed and by additionally injecting air, fuel, or the like from the jetting nozzles 406a and 406b during one working stroke, movability and combustion force can be enhanced. Secondarily, it is possible to use exhaust gas as secondary fuel. Moreover, in the embodiment, the example is shown in which two jetting nozzles are provided, however, the present invention is not limited to this and more jetting nozzles may be provided.

Sixth Embodiment

Figure 15:
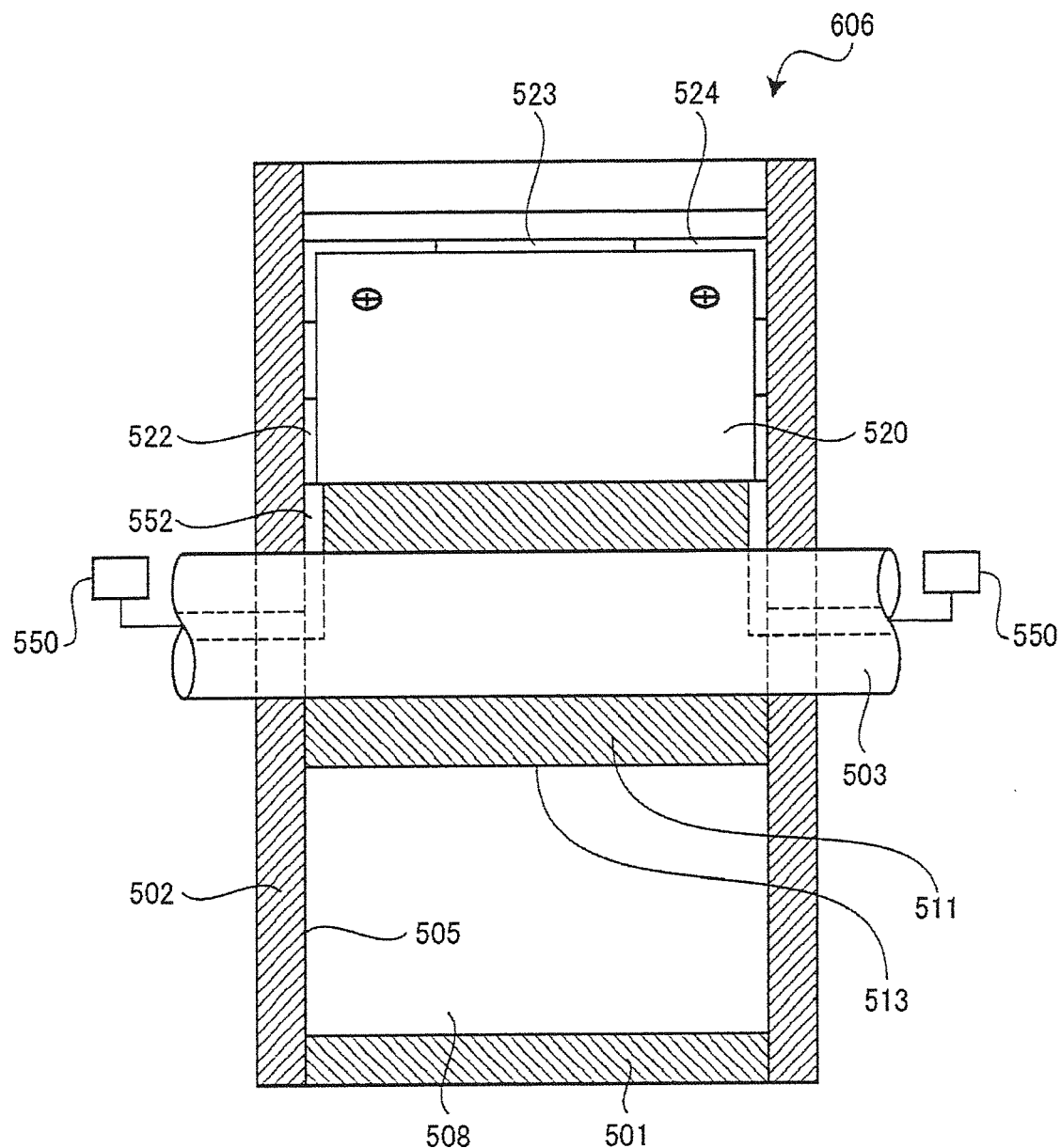
FIG. 15 is a partial cross-sectional diagram of a rotary internal combustion engine according to a sixth embodiment.
Figure 16:
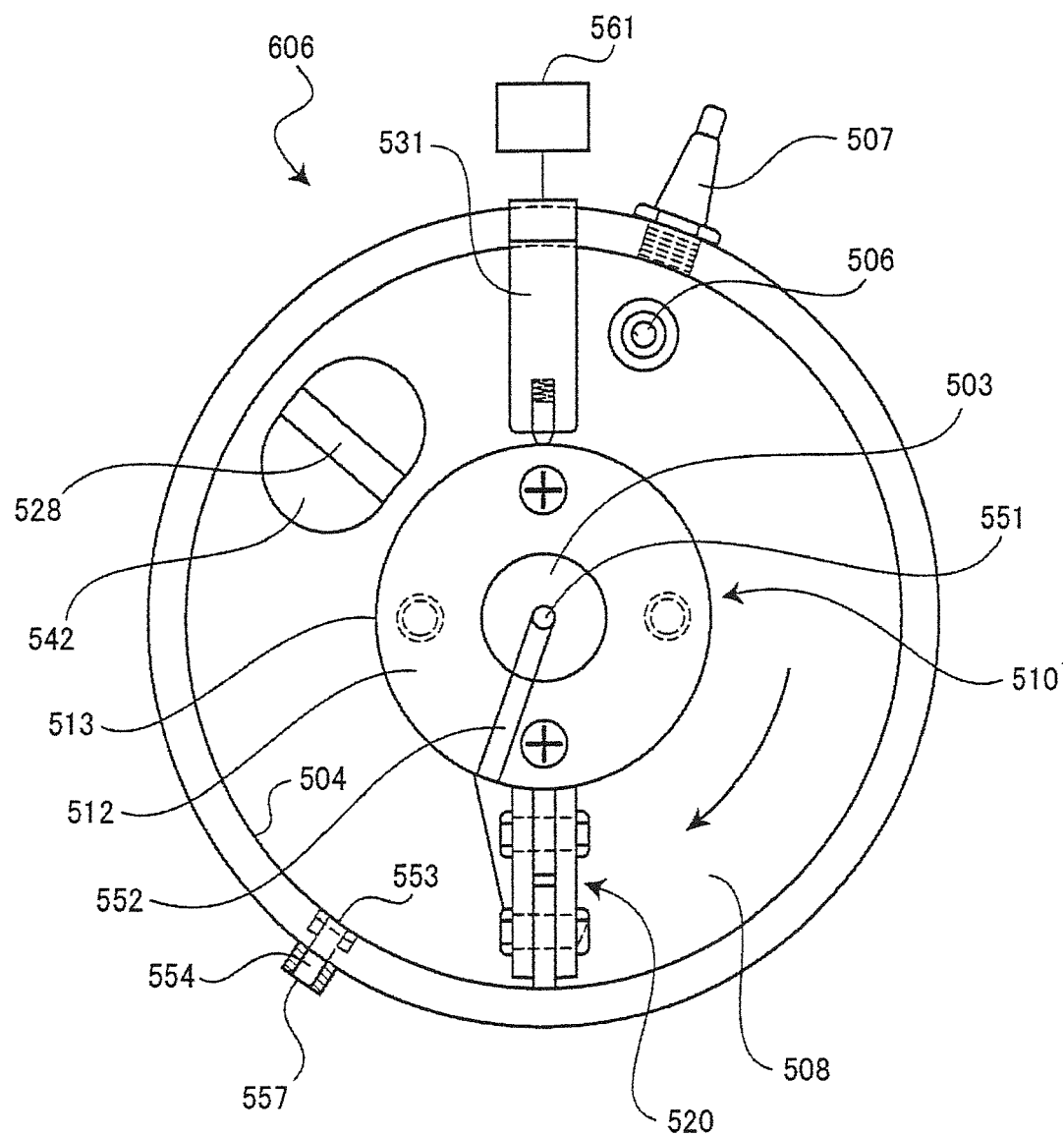
FIG. 16 is a partial cross-sectional diagram of a rotary internal combustion engine according to the sixth embodiment.

FIGS. 15 and 16 are partial cross-sectional diagrams of the rotary internal combustion engine 606 of the sixth embodiment of the present invention. As shown in FIGS. 15 and 16, a working shaft 503 is run concentrically through a cylinder 501 and a rotor 510 is attached to the working shaft 503 in a fixed manner. The rotor 510 is constructed of a rotor base 511 made up of a circular shell and a rotor blade 520 disposed in a direction of a rotor base surrounding wall 513. The rotor base 511 and rotor blade 520 are formed integrally. The upper portion of the shutoff valve 531 is hermetically held in the horizontal valve groove formed in the cylinder circumferential wall 504 and the lower end face of the shutoff valve 531 is hermetically in contact with the rotor base surrounding wall 513 described above to form a sliding face of the rotor base 511. The driving of the shutoff valve 531 is controlled by a valve reciprocating mechanism 561. All components required for performing one working stroke are provided. In the example, on a exhaust hole 542 is formed a bridging plate 529 so that the rotor blade 520 can pass through smoothly.

In the rotary internal combustion engine 606 of the sixth embodiment, a lubricating oil required in a rotor 510 and between cylinder inner walls 504 and 505 is supplied by configuring the engine 606 as follows. That is, each of oil transfer holes 551 passing through a shaft center of the working shaft 503 extends from both left/right ends toward its center and, when passing over a line of s cylinder side inner wall 505, changes an angle in a radial direction. Each of the left/right oil transfer holes 551, immediately when coming out to surfaces of the shaft, is connected to a oil transfer groove 552 formed on left/right side surfaces of the rotor base 511. The left/right oil transfer grooves 552 are opened at the rotor base surrounding wall 513 in a position before a base of the rotor blade 520 and are terminated.

At the time of working of the rotary internal combustion engine 606, the lubricating oil fed from a oil supplying pump 550 when entering an oil transfer groove 552 lubricates both sides of the rotor base 511 and when going out from the oil transfer groove 552 also lubricates seal plates 522 to 524 attached on left/right sides of the rotor blade 520 by centrifugal force of rotation of the rotor 510. Excessive lubricating oil stays in a bottom of the cylinder circumferential wall 503 to provide lubrication to the seal plates 523 to 524 on a top surface of the rotor blade 520. The excessive lubricating oil drops, due to sweeping by the rotor 510, into an oil collecting groove 553 formed in the cylinder circumferential wall 504 and, further, enters an oil collecting hole 554 and is circulated for reuse. The excessive lubricating oil after being circulated is collected by an oil collecting mechanism 557.

As described above, the rotary internal combustion engine 606 of the sixth embodiment includes the oil transfer hole 551 and oil transfer groove 552 configured to transfer the lubricating oil fed from the oil supply pump 550, the oil collecting groove 553 to collect the excessive lubricating oil and the oil collecting hole 554 to let the collected oil be circulated for reuse. The oil transfer holes 551 passes through a shaft center of the working shaft 503 and extends from both left/right ends toward a center and, when passing over a line of s cylinder side inner wall 505, changes an angle in a radial direction and the left/right oil transfer holes 551, immediately after coming out to surfaces of the shaft, is connected to the oil transfer groove 552 formed on left/right side surfaces of the rotor base 511 and the left/right oil transfer grooves 552 are opened at the rotor base surrounding wall 513 in a position before a base of the rotor blade 520 and is then terminated. At the time of working of the rotary internal combustion engine 606, the lubricating oil fed from the oil supplying pump 550, when entering the oil transfer groove 552, lubricates both sides of the rotor base 511 and, when going out from the oil transfer groove 552, also lubricates left/right sides of the rotor blade 520 by centrifugal force of rotation of the rotor 510 and excessive lubricating oil stays in a bottom of the cylinder circumferential wall 504 to provide lubrication to the top surface of the rotor blade 520 and the excessive lubricating oil drops, due to sweeping by the rotor 510, into the oil collecting groove 553 formed in the cylinder circumferential wall 504 and further enters the oil collecting hole 554 and is circulated for reuse and the excessive lubricating oil after being circulated is collected by an oil collecting mechanism 557.

Therefore, according to the sixth embodiment, when a lubricating oil is supplied between the internal walls 504 and 505 of the cylinder 501 being contact with an outer edge of the rotor 510, the oil transfer hole 551 having been run through the working shaft 503 is guided in a radial direction and enters the oil transfer groove 552 to lubricate both sides of the rotor 510 and, further, the lubricating oil flown away from the oil transfer groove 552 by centrifugal force of the rotating rotor 510 also lubricate an outer edge of the rotor 510, that is, a rotor seal and its contact wall. Excessive lubricating oil enters the oil collecting groove 553 and is circulated for reuse and, therefore, the lubricating oil is supplied to an entire portions, in a manner to eliminate waste. Moreover, the lubricating means of the lubricating oil shown in the sixth embodiment is one of examples and other various methods of lubricating may be used in the construction of the rotary internal combustion engine.

INDUSTRIAL APPLICABILITY

The rotary internal combustion engine described in each of the above embodiments has a shape so as to use a variety of kinds of fuel such as gasoline, light oil, natural gas, organic brewing fuel, heavy oil, or hydrogen gas. The internal combustion engine of the invention has big and flexible capabilities to respond to a large or small scale.

The invention claimed is:
1. A rotary internal combustion engine comprising:
   a cylinder having a cylinder circumferential wall provided with a horizontal valve groove on an inner circumferential surface thereof;
   a working shaft concentrically run through said cylinder and held to be freely rotatable;
   a rotor which includes a rotor base made of a circular shell, a rotor base surrounding wall, and a rotor blade standing in a radial direction of the rotor base surrounding wall, and which is firmly fixed to said working shaft;
   a shutoff valve which performs intermittent movements of insertion and returning between an outside of said cylinder and a cylinder space defined inside the cylinder; and
   left and right side lids each having one of two longitudinal valve grooves,
   wherein, in a manner to be timed to the insertion of said shutoff valve into said cylinder space, a radial distance in a circular rotation angle region of said rotor base is shortened by an interference prevention distance so that said rotor base surrounding wall has a cam-like shape;

in the cylinder space, both side faces of said rotor base and all outer edge portions of said rotor blade are hermetically in contact with left and right inner walls of the cylinder and the cylinder circumferential wall;

when the insertion of said shutoff valve into the cylinder space is completed, both ends of said shutoff valve are hermetically held by the two longitudinal valve grooves formed in the left and right side lids respectively, an upper portion of said shutoff valve is hermetically held by the horizontal valve groove formed in said cylinder circumferential wall and a lower end surface of said shutoff valve is hermetically in contact with said rotor base circumferential wall to form a sliding face of said rotor base;

immediately after passing of said rotor blade through a position of said shutoff valve, said shutoff valve is inserted into said cylinder space to stop up said cylinder space in a radial direction, and compressed mixed air, or compressed air and fuel is/are injected into a sealed layer, which serves as a combustion chamber and which is defined between said shutoff valve and said rotor blade, to be ignited or fired in the combustion chamber, and further said rotor blade is pressed with combustion expansion pressure, with said shutoff valve as a base point for a mechanical action, to directly provide rotation to said working shaft, and combustion gas is released through an exhaust hole and said shutoff valve is returned back to an outside of said cylinder for preparation of a next stroke to terminate one working stroke.

2. The rotary internal combustion engine according to claim 1, wherein said shutoff valve has a valve body and an adjusting valve disposed in a lower portion of said valve body;

an elastic body is interposed in a gap between said valve body and said adjusting valve to make a distance between said valve body and said adjusting valve be adjustable; and the gap between said valve body and said adjusting valve is filled up by any one of a depth-of-cut matching method, half-lap joint matching method and superposition method of components constructing said valve body and said adjusting valve to make up/down distance to be adjustable.

3. The rotary internal combustion engine according to claim 1, wherein said rotor base is divided into a plurality of portions in left and right directions to provide an appropriate interval among the divided portions, and a left and right distance therebetween is made adjustable with an elastic body provided between said divided portions; and further being adjustable by maintaining hermeticity between in front and at the rear of said rotor by any one of a depth-of-cut matching method, half-lap joint matching method, and superposition method of components constructing said rotor base.

4. The rotary internal combustion engine according to claim 1, wherein said rotor blade includes a blade base plate, a rectangular base directing upward from a center of a planar lower portion of said blade base plate, side seal plates disposed in left and right directions of said base, a top seal plate disposed in an upper portion of said base, and corner seal plates disposed at tangential angle portions in an upper portion of said base, wherein a distance corresponding to a seizure prevention distance is provided between an upper head portion of said blade base plate and said cylinder circumferential wall, and between both side end faces of said blade base plate and said left and right inner walls, respectively, said side seal plates, said top seal plate, and said corner seal plates fill up a distance corresponding to said seizure prevention distance between outer ends of said blade base plate and facing walls and are hermetically in contact with said facing walls, appropriate intervals are provided between said base and each of internal side end faces of said side seal plate, said top seal plate, and said corner seal plate; the intervals are made adjustable by using an elastic body; each of said seal plates is pressed properly to ensure contacts between each of said seal plates and said facing walls; and hermeticity between in front and at the rear of said rotor blade is maintained by a junction using any one of a depth-of-cut matching method, half-lap joint matching method, and superposition method among components constructing said side seal plates, top seal plate, and corner seal plates.

5. The rotary internal combustion engine according to claim 4, wherein each of the holes and grooves is bridged by at least any of said side seal plates, said top seal plate, and said corner seal plates provided with a ski having a predetermined length.

6. The rotary internal combustion engine according to claim 1, wherein said rotor has N (N=1, 2, 3, . . . ) pieces of said rotor blade; the rotary internal combustion engine is provided with components which are capable of performing the one working stroke for every one N-th rotation of said rotor and which includes said shutoff valve, injection nozzles, ignition plugs and exhaust holes; and for every one N-th rotation of said rotor, the working stroke is completed N times.

7. The rotary internal combustion engine according to claim 1, further comprising:
a sub-combustion chamber disposed on the outside of said cylinder in a forth direction of said shutoff valve;
two high-pressure air nozzles positioned in said sub-combustion chamber to face each other; and
a fuel nozzle attached to point a portion toward which said high-pressure air nozzles inject,
wherein in said sub-combustion chamber, air injected from said two high-pressure air nozzles positioned to face each other and fuel injected from said fuel nozzle cause mixing and stirring of gas and ignition.

8. The rotary internal combustion engine according to claim 1, wherein, a plurality of pieces of the injection nozzle is provided to face the cylinder space with proper positioning of a working angle corresponding to travel of said rotor relative to said shutoff valve; and
any one of high-pressure air, fuel, or mixed air is injected from each of the nozzles to said combustion chamber, which is said sealed layer defined between said shut-off valve and said rotor blade, at the time of working.

9. The rotary internal combustion engine according to claim 1, further comprising:
oil feeding holes and oil feeding grooves to feed a lubricating oil supplied from an oil supply pump;
an oil collecting groove to collect excessive lubricating oil; and
an oil collecting hole to make the collected oil be circulated for reuse;
wherein said oil feeding holes each pass through a shaft center of said working shaft and extend from both left and right ends toward a center and, change an angle in the radial direction at a position passing over a line of a cylinder side inner wall; and said oil feeding holes extending from the left and right ends, immediately after coming out to surfaces of the shaft, are connected to said oil feeding grooves formed on left and right side surfaces of said rotor base, the left and right oil feeding grooves are terminated while being opened at said rotor base surrounding wall at a position in front of a base of said rotor blade; and at the time of working of said rotary internal combustion engine, the lubricating oil fed from the oil supplying pump enters said oil feeding grooves and lubricates both of the side faces of said rotor base and the lubricating oil goes out from said oil feeding grooves onto said rotor base surrounding wall and also lubricates left and right side surfaces of said rotor blade by centrifugal force of rotation of said rotor; and excessive lubricating oil stays in a bottom of said cylinder circumferential wall to provide lubrication to a top surface of said rotor blade and the excessive lubricating oil drops, due to sweeping by said rotor, into said oil collecting groove formed in said cylinder circumferential wall and further enters said oil collecting hole and is circulated for reuse.

* * * * *